(12) United States Patent
Kotipalli et al.

(10) Patent No.: US 7,801,722 B2
(45) Date of Patent: Sep. 21, 2010

(54) TECHNIQUES FOR CUSTOMIZATION OF PHONETIC SCHEMES

(75) Inventors: Krishna V. Kotipalli, Issaquah, WA (US); Bhrighu Sareen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 903 days.

(21) Appl. No.: 11/701,140

(22) Filed: Feb. 1, 2007

(65) Prior Publication Data
US 2007/0276650 A1 Nov. 29, 2007

Related U.S. Application Data

(63) Continuation-in-part of application No. 11/439,563, filed on May 23, 2006.

(51) Int. Cl.
G06F 17/20 (2006.01)
(52) U.S. Cl. ....................................................... 704/8
(58) Field of Classification Search .................. 704/8
See application file for complete search history.

(56) References Cited

U.S. PATENT DOCUMENTS

| | | | |
|---|---|---|---|
| 5,136,504 A * | 8/1992 | Fushimoto | 704/10 |
| 5,535,119 A | 7/1996 | Ito et al. | |
| 5,953,692 A | 9/1999 | Siegel | |
| 6,078,885 A | 6/2000 | Beutnagel | |
| 6,356,866 B1 | 3/2002 | Pratley et al. | |
| 6,362,752 B1 * | 3/2002 | Guo et al. | 341/28 |
| 6,363,342 B2 | 3/2002 | Shaw et al. | |
| 6,377,966 B1 | 4/2002 | Cooper et al. | |
| 6,562,078 B1 * | 5/2003 | Yang et al. | 715/202 |
| 6,848,080 B1 | 1/2005 | Lee et al. | |
| 7,107,204 B1 * | 9/2006 | Liu et al. | 704/2 |
| 7,398,199 B2 * | 7/2008 | Gong | 704/8 |
| 7,484,106 B2 * | 1/2009 | Rhoten et al. | 713/193 |
| 7,502,632 B2 * | 3/2009 | Ciminelli | 455/563 |
| 7,554,529 B2 * | 6/2009 | Kotipalli | 345/168 |
| 7,636,083 B2 * | 12/2009 | Aoki et al. | 345/172 |
| 2004/0024604 A1 | 2/2004 | Wen et al. | |
| 2004/0039996 A1 | 2/2004 | Flam | |
| 2005/0017954 A1 * | 1/2005 | Kay et al. | 345/169 |
| 2005/0060138 A1 | 3/2005 | Wang et al. | |
| 2005/0182616 A1 | 8/2005 | Kotipalli | |
| 2006/0018545 A1 | 1/2006 | Zhang et al. | |

OTHER PUBLICATIONS

"How to Input Chinese in English Windows", Date: 2005, http://www.newconcept.com/Reference/how_input_chinese.html#2.%/20Summary.

Bansal, et al., "Isolated-word Error Correction for Partially Phonemic Languages using Phonetic Cues", http://www.mla.iitkgp.ernet.in/~monojit/papers/bansal.pdf.

(Continued)

*Primary Examiner*—Susan McFadden

(57) ABSTRACT

Creating and using phonetic schemes is described. A phonetic scheme creation feature is provided to allow a user to create a phonetic scheme that has one or more available phonetic character combinations in a source language and a resulting one or more native characters in a destination language for each of the phonetic character combinations. A phonetic input application is provided that can read the phonetic scheme to translate a respective character combination that is input by the user in the source language into the corresponding resulting native characters in the destination language. The phonetic scheme can be stored in a format that can be transferred to another computer. A dynamic help file can be created to document the phonetic scheme created by the user.

18 Claims, 30 Drawing Sheets

OTHER PUBLICATIONS

Cooke, et al., "A tool for automatic feedback on phonemic transcriptions", http://www.dcs.shef.ac.uk/~martin/docs/es.pdf.

"International Search Report", PCT/US2008/052862, Jun. 17, 2008, pp. 14.

* cited by examiner

| s स्<br>sa स | saa सा | |
| si सि | sii सी | |
| su सु | suu सू | |
| sr^u सृ | sr^uu सॄ | |
| se से | see सॆ | sai सै |
| so सो | soo सॊ | sau सौ |
| saM सं | sa^n सँ | saH सः |
| sch स्च् | sth स्त् | sm स्म् |
| sh ष्<br>sha ष | shaa षा | |
| S श्<br>Sa श | Saa शा | |

FIG. 10

544 — శో
542 — SHIFT, S
540

| S ‌శ్ | | |
|---|---|---|
| Sa క | Saa కా | |
| Si కి | Sii కీ | |
| Su కు | Suu కూ | |
| Sr^u కృ | Sr^uu కౄ | |
| Se కె | See కే | Sai కై |
| So కొ | Soo కో | Sau కౌ |
| SaM కం | Sa^n కఁ | SaH కః |
| Sya క్య | Sra క్ర | Ssa క్స |
| sh ష | | |
| sha షా | shaa షా | |
| s స్ | | |
| sa స | saa సా | |

FIG. 11

| | | |
|---|---|---|
| S श्<br>Sa श<br>Si शि<br>Su शु<br>Sr^u शृ<br>Se शे<br>So शो<br>SaM शं | Saa शा<br>Sii शी<br>Suu शू<br>Sr^uu शॄ<br>See शैं<br>Soo शैं<br>Sa^n शँ | Sai शै<br>Sau शै<br>SaH श: |
| Sya श्य | Sra श्र | Ssa श्श |
| sh ष्<br>sha ष | shaa षा | |
| s स्<br>sa स | saa सा | |

| TELUGU 902 | 904 |
|---|---|
| PHONETIC | NATIVE |
| VOWELS | |
| a aa, A I ii, I u uu, U r^u r^uu l^u l^uu | అ ఆ ఇ ఈ ఉ ఊ ఋ ఌ ఌా |
| e ee, E ai o oo, O au aM aH | ఎ ఏ ఐ ఒ ఓ ఔ అం అః |
| CONSONANTS | |
| ka Ka ga Ga N~a | క ఖ గ ఘ ఙ |
| ca Ca ja Ja n~a | చ ఛ జ ఝ ఞ |
| Ta Tha Da Dha Na | ట ఠ డ ఢ ణ |
| ta tha da dha na | త థ ద ధ న |
| pa Pa ba Ba ma | ప ఫ బ భ మ |
| ya ra Ra la La va | య ర ఱ ల ళ వ |
| sha Sha sa ha kSha jna | శ ష స హ క్ష జ్ఞ |
| SPECIALS | |
| a~n | అఁ |
| \ \- \\ | ZWNJ ZWJ \ |
| DIGITS | |
| 0 1 2 3 4 5 6 7 8 9 | ౦ ౧ ౨ ౩ ౪ ౫ ౬ ౭ ౮ ౯ |

TECHNIQUES FOR CUSTOMIZATION OF PHONETIC SCHEMES

CROSS-REFERENCE TO RELATED APPLICATIONS

This is a continuation-in-part application of application Ser. No. 11/439,563, filed May 23, 2006, the specification of which is incorporated by reference herein in its entirety.

BACKGROUND

Given the fact that there are dozens if not hundreds of different Indic language dialects, hardware manufacturers selling to such customers standardize in making computer keyboards in a second language commonly known by customers across dialects, which in many cases is an English keyboard. This either requires the customer to know English fluently in order to type on the English keyboard, or that they use some software program that allows them to somehow select characters in a local dialect in a tedious fashion, such as by selecting the characters from a symbol list from an on-screen keyboard or from a physical keyboard which has the local language characters. The input problem in such languages is compounded by the fact that multiple characters are usually associated with a single character, and the case of the character often determines the character that will be ultimately obtained. Furthermore, users may have to learn the input style and/or syntax of the languages supported. Other types of languages suffer from similar input problems.

SUMMARY

Various technologies and techniques are disclosed for providing suggestion lists for phonetic input. The system receives user input from an input device in a source language. The input is a partial phonetic representation in the source language (such as English) of a character desired by a user in a destination language (such as an Indic language). Based on the user's input, a suggestion list is generated that includes a set of key/character combinations that can be pressed/entered using the input device in the source language to achieve at least one resulting character in the destination language. The suggestion list is dynamically generated based upon a prior usage history of the user. The suggestion list is displayed to the user on a display. The user can customize various suggestion list display settings, such as orientation, selection method, and display style. Upon generating the suggestion list, the display settings are retrieved, and the suggestion list is formatted according to the display settings.

In another implementation, various technologies and techniques are disclosed for creating and using phonetic schemes. A phonetic scheme creation feature is provided to allow a user to create a phonetic scheme that has one or more available phonetic character combinations in a source language and a resulting one or more native characters in a destination language for each of the phonetic character combinations. A phonetic input application is provided that can read the phonetic scheme to translate a respective character combination that is input by the user in the source language into the corresponding resulting native characters in the destination language. In one implementation, suggestion lists are provided after partial user input of a phonetic character combination.

The phonetic scheme can be stored in a format that can be transferred to another computer. As a few non-limiting examples, the phonetic scheme can be stored in an XML or other user-readable file format, or in a compiled phonetic scheme file. A dynamic help file can be created to document the phonetic scheme created by the user. In one implementation, the user can further customize the help file.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 10 is a diagram for one implementation of the system of FIG. 1 that illustrates a simulated suggestion list based on lower case input with English as a source language and Hindi as a destination language.

FIG. 11 is a diagram for one implementation of the system of FIG. 1 that illustrates a simulated suggestion list based on upper case input with English as a source language and Telugu as a destination language.

FIG. 12 is a diagram for one implementation of the system of FIG. 1 that illustrates a simulated suggestion list based on upper case input with English as a source language and Hindi as a destination language.

FIG. 29 is a simulated screen for one implementation that illustrates creating or modifying a phonetic scheme.

FIG. 30 is a simulated screen for one implementation that illustrates a dynamic help file that was created for a phonetic scheme.

DETAILED DESCRIPTION

Figure 1:
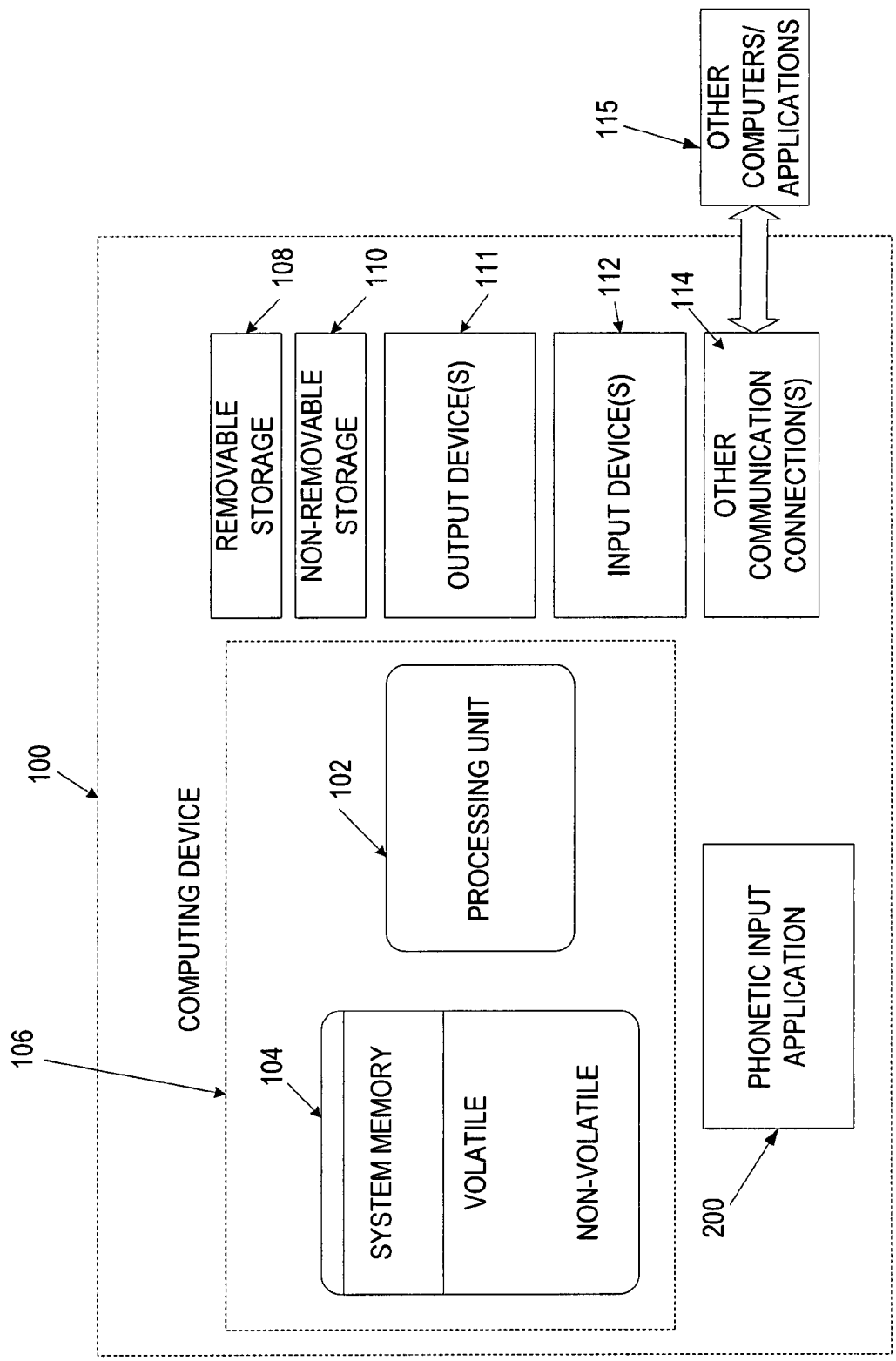
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a phonetic input application, but the system also serves other purposes in addition to these. In one implementation, one or more of the techniques described herein can be implemented as features within a word processing program such as MICROSOFT® Office Word, MICROSOFT® Office Excel, Corel WordPerfect, or from any other type of program or service that allows a user to input data. In another implementation, one or more of the techniques described herein are implemented as features with other applications that deal with user input.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes phonetic input application 200. Phonetic input application 200 will be described in further detail in FIG. 2.

Figure 2:
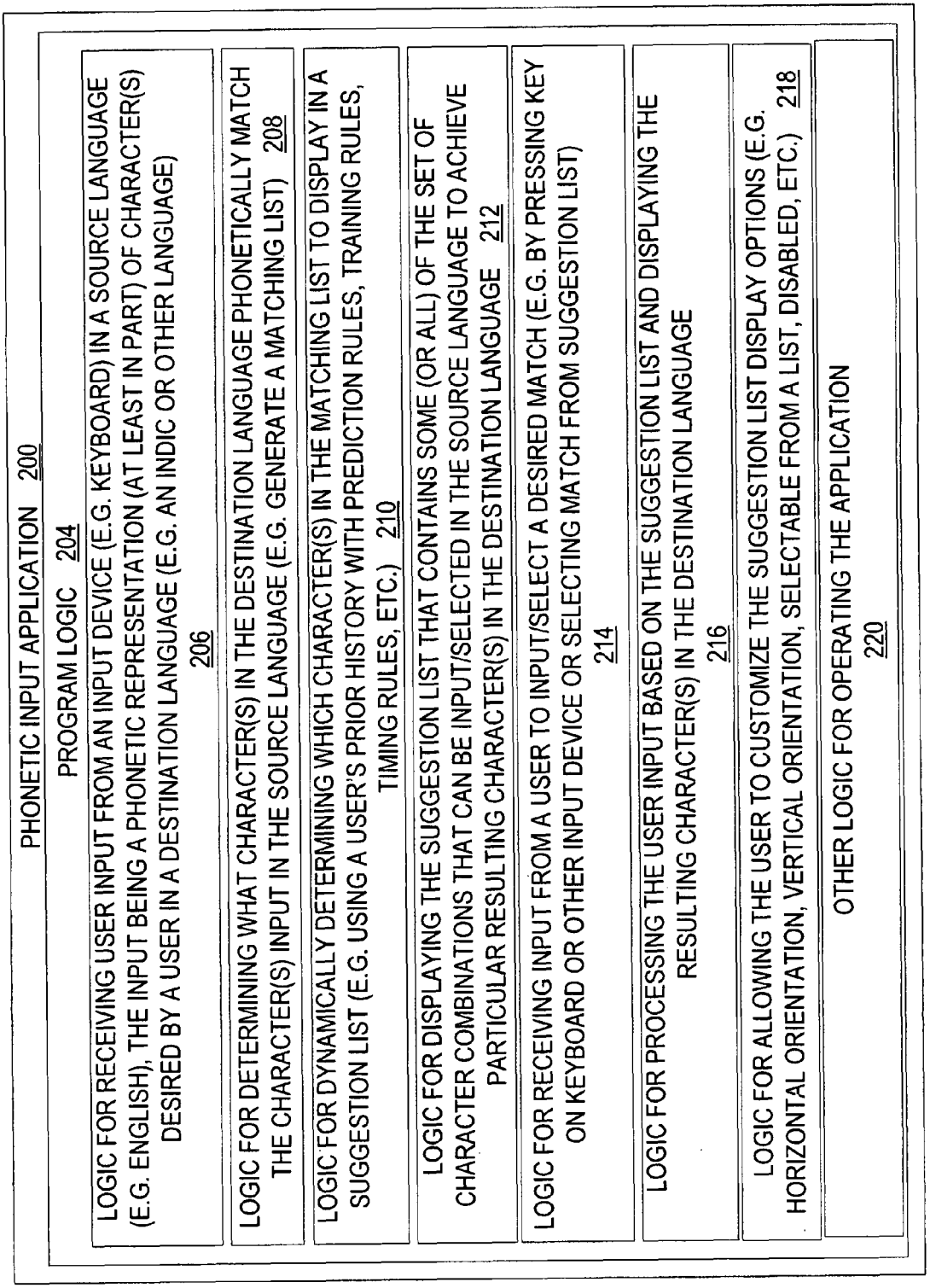
FIG. 2 is a diagrammatic view of a phonetic input application of one implementation operating on the computer system of FIG. 1.

Turning now to FIG. 2 with continued reference to FIG. 1, a phonetic input application 200 operating on computing device 100 is illustrated. Phonetic input application 200 is one of the application programs that reside on computing device 100. However, it will be understood that phonetic input application 200 can alternatively or additionally be embodied as computer-executable instructions on one or more computers and/or in different variations than shown on FIG. 1. Alternatively or additionally, one or more parts of phonetic input application 200 can be part of system memory 104, on other computers and/or applications 115, or other such variations as would occur to one in the computer software art.

Phonetic input application 200 includes program logic 204, which is responsible for carrying out some or all of the techniques described herein. Program logic 204 includes logic for receiving user input from an input device (e.g. keyboard, pen, etc.) in a source language (e.g. English), the input being a phonetic representation (at least in part) of character(s) desired by a user in a destination language (e.g. an Indic or other language) 206; logic for determining what character(s) in the destination language phonetically match the character(s) input in the source language (e.g. generate a matching list) 208; logic for dynamically determining which character(s) in the matching list to display in a suggestion list (e.g. based on user's prior history with prediction rules, training rules, timing rules, etc.) 210; logic for displaying the suggestion list that contains some (or all) of the combinations that can be input/selected to achieve particular resulting character(s) in the destination language 212; logic for receiving input from a user to input/select a desired match (e.g. by pressing/entering a key/character on a keyboard or other input device or selecting a match from suggestion list) 214; logic for processing the user input based on the suggestion list and displaying the resulting character(s) in the destination language 216; logic for allowing the user to customize the suggestion list display options (e.g. horizontal orientation, vertical orientation, selectable from a list, disabled, etc.) 218; and other logic for operating the application 220. In one implementation, program logic 204 is operable to be called programmatically from another program, such as using a single call to a procedure in program logic 204.

Figure 3:
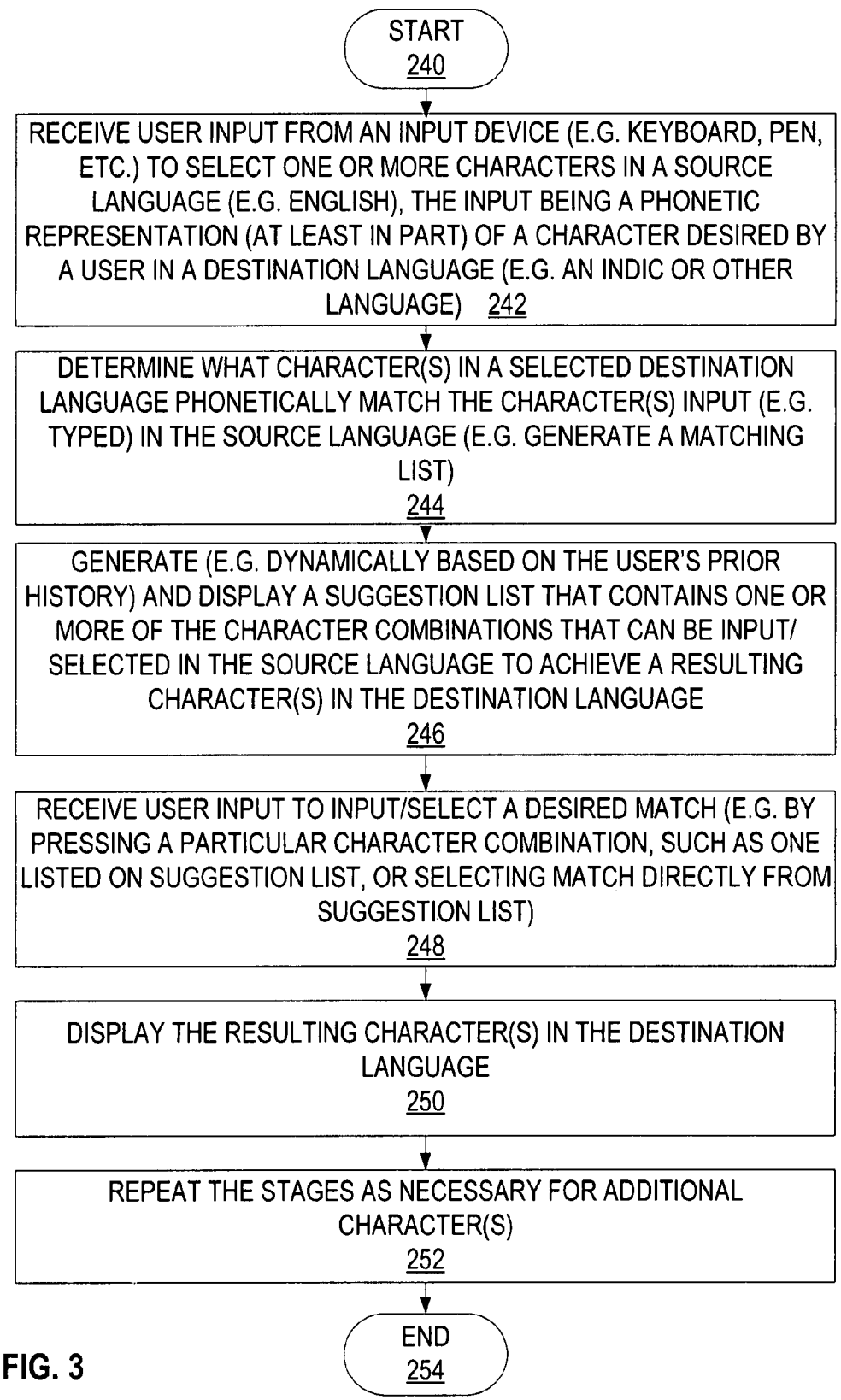
FIG. 3 is a high-level process flow diagram for one implementation of the system of FIG. 1.

Turning now to FIGS. 3-8 with continued reference to FIGS. 1-2, the stages for implementing one or more implementations of phonetic input application 200 are described in further detail. FIG. 3 is a high level process flow diagram for phonetic input application 200. In one form, the process of FIG. 3 is at least partially implemented in the operating logic of computing device 100. The procedure begins at start point 240 with receiving user input from an input device (e.g. keyboard, pen, etc.) to select one or more characters in a source language (e.g. English) (stage 242). The input is a phonetic representation (at least in part) of one or more characters desired by a user in a destination language, such as Indic or another language (stage 242). The system determines what characters(s) in a selected destination language phonetically match the character(s) input (e.g. typed) in the source language (e.g. generates a matching list) (stage 244). The system generates a suggestion list, such as dynamically based on the user's prior history (stage 246). The suggestion list is displayed that contains one or more of the character combinations that can be input/selected in the source language to achieve the resulting character(s) in the destination language (stage 246). The system receives user input to input/select a desired match (e.g. by pressing character combination from suggestion list or selecting match directly from suggestion list) (stage 248). The system displays the resulting character (s) in the destination language on a display (stage 250). The stages are repeated as necessary for additional characters (stage 252). The process ends at end point 254.

Figure 4:
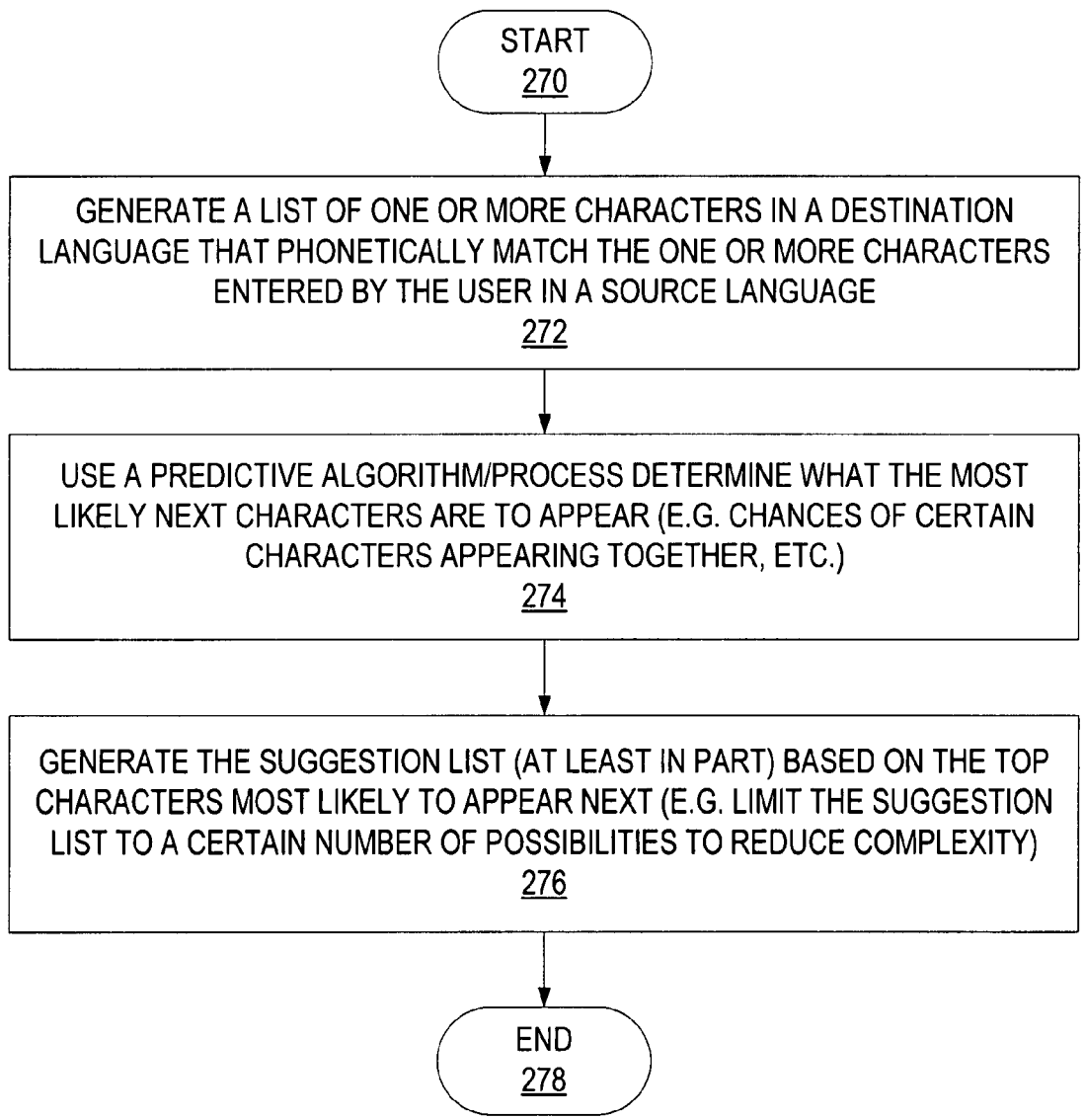
FIG. 4 is a process flow diagram for one implementation of the system of FIG. 1 illustrating the stages involved in generating a suggestion list based on a prediction.

FIG. 4 illustrates one implementation of the stages involved in generating a suggestion list based on a prediction. In one form, the process of FIG. 4 is at least partially implemented in the operating logic of computing device 100. The procedure begins at start point 270 with generating a list of one or more characters in a destination language that phonetically match (at least in part) the one or more characters entered by the user in a source language (stage 272). The system uses a predictive algorithm/process to determine what the most likely next characters are to appear (e.g. chances of certain characters appearing together, etc.) (stage 274). The suggestion list is then generated (at least in part) based on the top characters most likely to appear next (stage 276). In other words, the suggestion list is limited to a certain number of possibilities to reduce complexity (stage 276). The process ends at end point 278.

Figure 5:
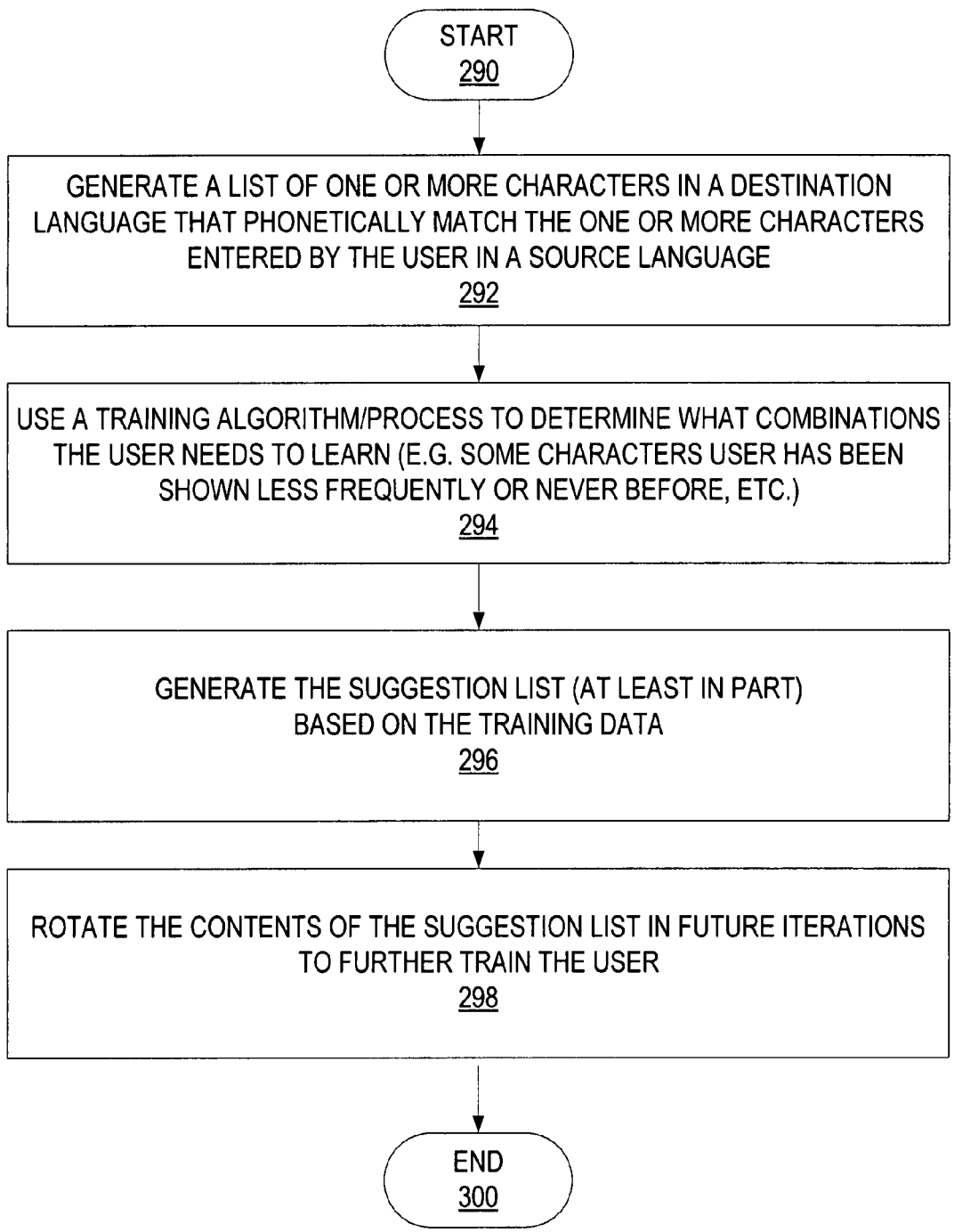
FIG. 5 is a process flow diagram for one implementation of the system of FIG. 1 illustrating the stages involved in generating a suggestion list based on a training goal.

FIG. 5 illustrates one implementation of the stages involved in generating a suggestion list based on a training goal. In one form, the process of FIG. 5 is at least partially implemented in the operating logic of computing device 100. The procedure begins at start point 290 with generating a list of one or more characters in a destination language that phonetically match the one or more characters entered by the user in a source language (stage 292). The system uses a training algorithm/process to determine what combinations of characters the user needs to learn (e.g. some characters user has been shown less frequently or never before, etc.) (stage 294). A suggestion list is generated (at least in part) based on the training data (stage 296). The contents of the suggestion list are rotated in future iterations to further train the user (stage 298). The process ends at end point 300.

Figure 6:
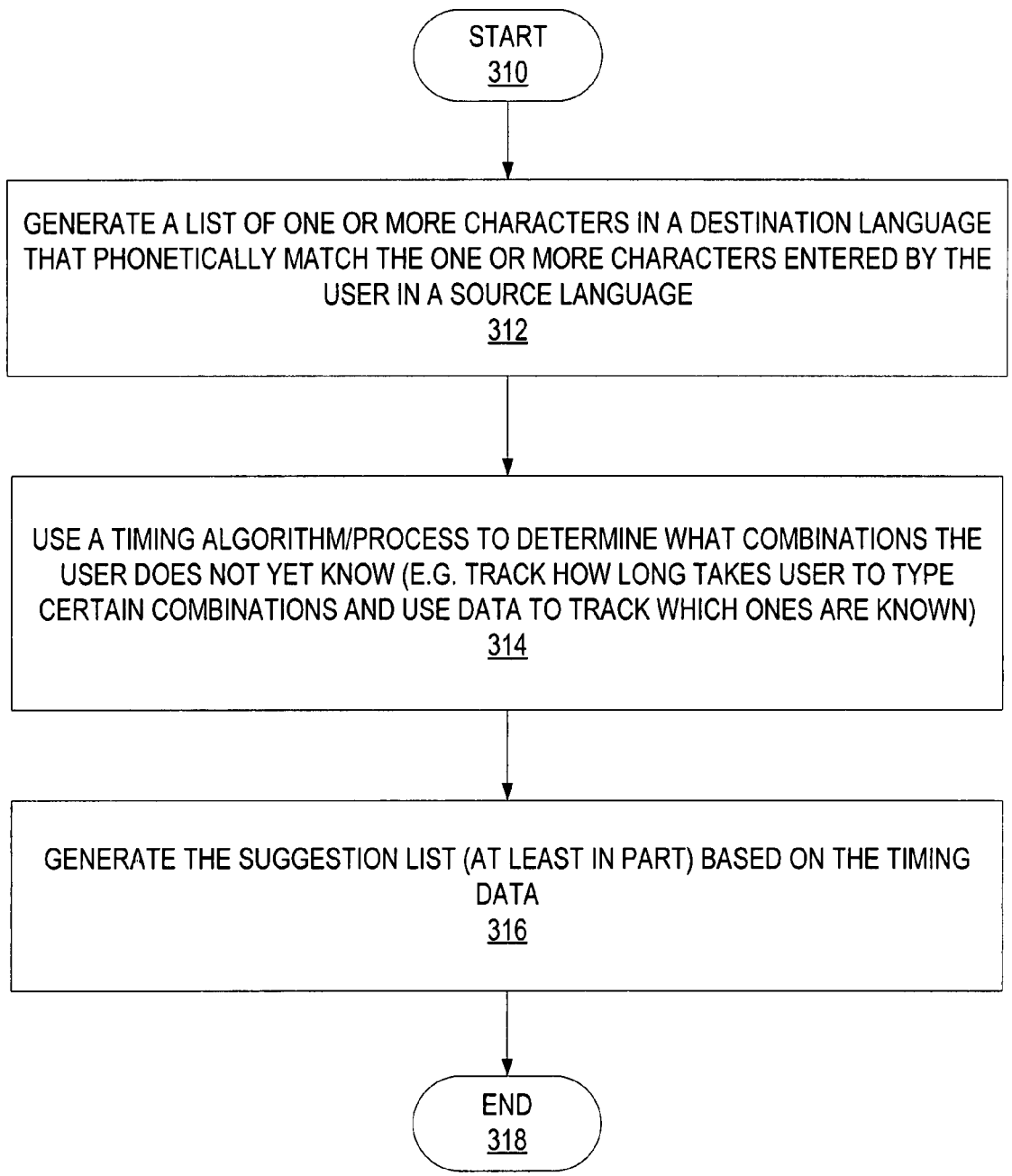
FIG. 6 is a process flow diagram for one implementation of the system of FIG. 1 illustrating the stages involved in generating a suggestion list based on timing.

FIG. 6 illustrates one implementation of the stages involved in generating a suggestion list based on timing. In one form, the process of FIG. 6 is at least partially implemented in the operating logic of computing device 100. The procedure begins at start point 310 with generating a list of one or more characters in a destination language that phonetically match the one or more characters entered by the user in a source language (stage 312). The system uses a timing algorithm/process to determine what combinations the user does not yet know (e.g. tracks how long it takes the user to type certain combinations and uses the data to track which character combinations are known) (stage 314). A suggestion list is generated (at least in part) based on the timing data (stage 316). The process ends at end point 318.

Figure 7:
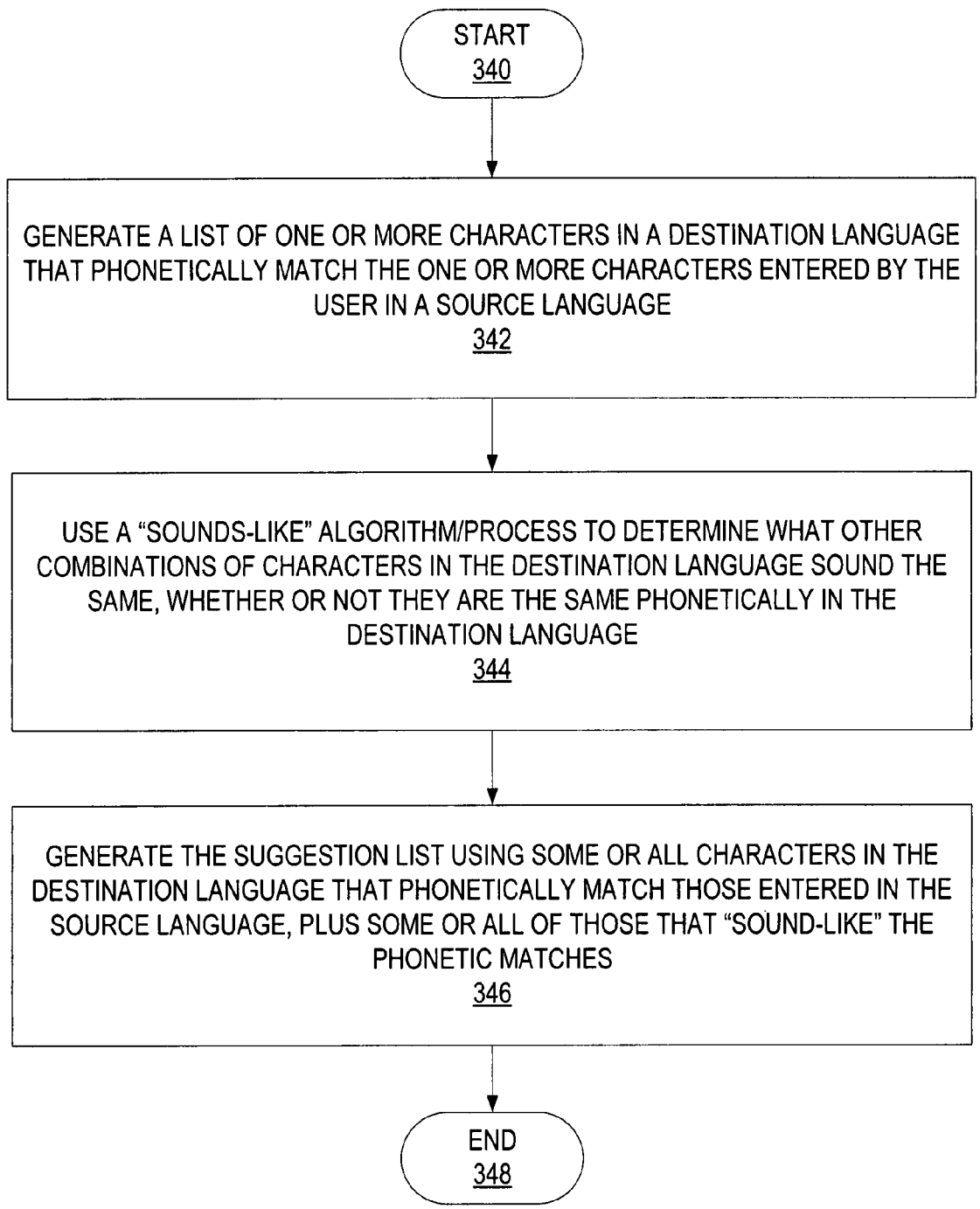
FIG. 7 is a process flow diagram for one implementation of the system of FIG. 1 that illustrates the stages involved in generating a suggestion list of what else could sound the same in the destination language.

FIG. 7 illustrates one implementation of the stages involved in generating a suggestion list that includes other characters that could sound the same in the destination language. In one form, the process of FIG. 7 is at least partially implemented in the operating logic of computing device 100. The procedure begins at start point 340 with generating a list of one or more characters in a destination language that phonetically match the one or more characters entered by the user in a source language (stage 342). The system uses a "sound-like" algorithm/process to determine what other combinations of characters in the destination language sound the same, whether or not they are the same phonetically in the destination language (stage 344). The suggestion list is generated using some or all characters in the destination language the phonetically match those entered in the source language, plus some or all of those that "sound-like" the phonetic matches (stage 346). The process ends at end point 348.

Figure 8:
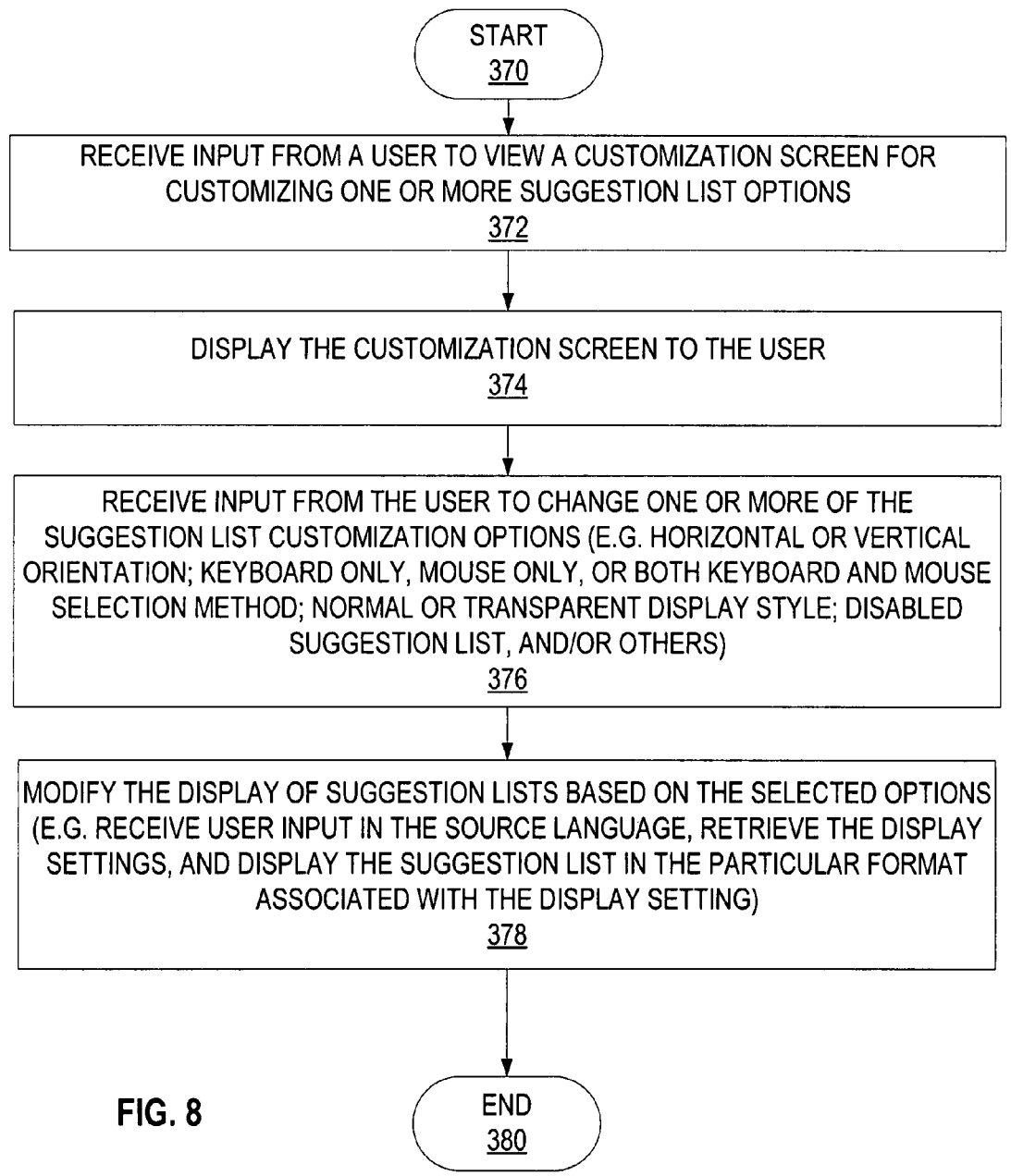
FIG. 8 is a process flow diagram for one implementation of the system of FIG. 1 that illustrates the stages involved in allowing a user to customize various suggestion list options.

FIG. 8 illustrates one implementation of the stages involved in allowing a user to customize various suggestion list options. In one form, the process of FIG. 8 is at least partially implemented in the operating logic of computing device 100. The procedure begins at start point 370 with receiving input from a user to view a customization screen for customizing one or more suggestion list options (stage 372). The customization screen is displayed to the user (stage 374). The system receives input from the user to change one or more of the suggestion list customization options (e.g. orientation, selection method, display style, disabled, and/or others) (stage 376). The display of future suggestion lists is modified based on the selection display options (stage 378). In other words, the system receives user input in the source language, retrieves the display settings, and displays the suggestion list in the particular format associated with the one or more display settings (stage 378). The process ends at end point 380.

Figure 9:
FIG. 9 is a diagram for one implementation of the system of FIG. 1 that illustrates a simulated suggestion list based on lower case input with English as a source language and Telugu as a destination language.

FIG. 9 is a diagram for one implementation of the system of FIG. 1 that illustrates a simulated suggestion list 500 based on lower case input with English as a source language and Telugu as a destination language. Upon pressing/entering the lower case "s" key 502 on a keyboard or other input device, suggestion list 500 is displayed to show various character combinations that can be pressed to achieve a desired character in the Telugu language. For example, without pressing a further character beyond the "s" 502, the character 504 will result because it is the matching character 508 in the suggestion list 500 for "s" 506. If the user further selects the letter "a" on an input device, then the "sa" combination 510 will result in character 512 being displayed.

FIG. 10 is a diagram for one implementation of the system of FIG. 1 that illustrates a simulated suggestion list 520 based on lower case input with English as a source language and Hindi as a destination language. Upon pressing/entering the lower case "s" key 522 on a keyboard or other input device, suggestion list 520 is displayed to show various character combinations that can be pressed to achieve a desired character in the Hindi language. For example, without pressing a further character beyond the "s" 522, the character 524 will result because it is the matching character 528 in the suggestion list 520 for "s" 526. If the user further selects the letter "a" on an input device, then the "sa" combination 530 will result in character 532 being displayed.

As mentioned previously, in Indic and other languages, a different set of characters is often associated with upper case characters than lower case characters. FIG. 11 is a diagram for one implementation of the system of FIG. 1 that illustrates a simulated suggestion list 540 based on upper case input with English as a source language and Telugu as a destination language. Upon pressing/entering the "shift"+"s" keys 542 in combination on a keyboard or other input device, suggestion list 540 is displayed based on the upper case input to show various character combinations that can be pressed to achieve a desired character. Since an upper case "S" was generated, character 544 is displayed because it matches the Telugu character entry 548 in the suggestion list for upper case "S" 546. Similarly, FIG. 12 illustrates a simulated suggestion list 560 based on upper case input with English as a source language and Hindi as a destination language.

Figure 13:
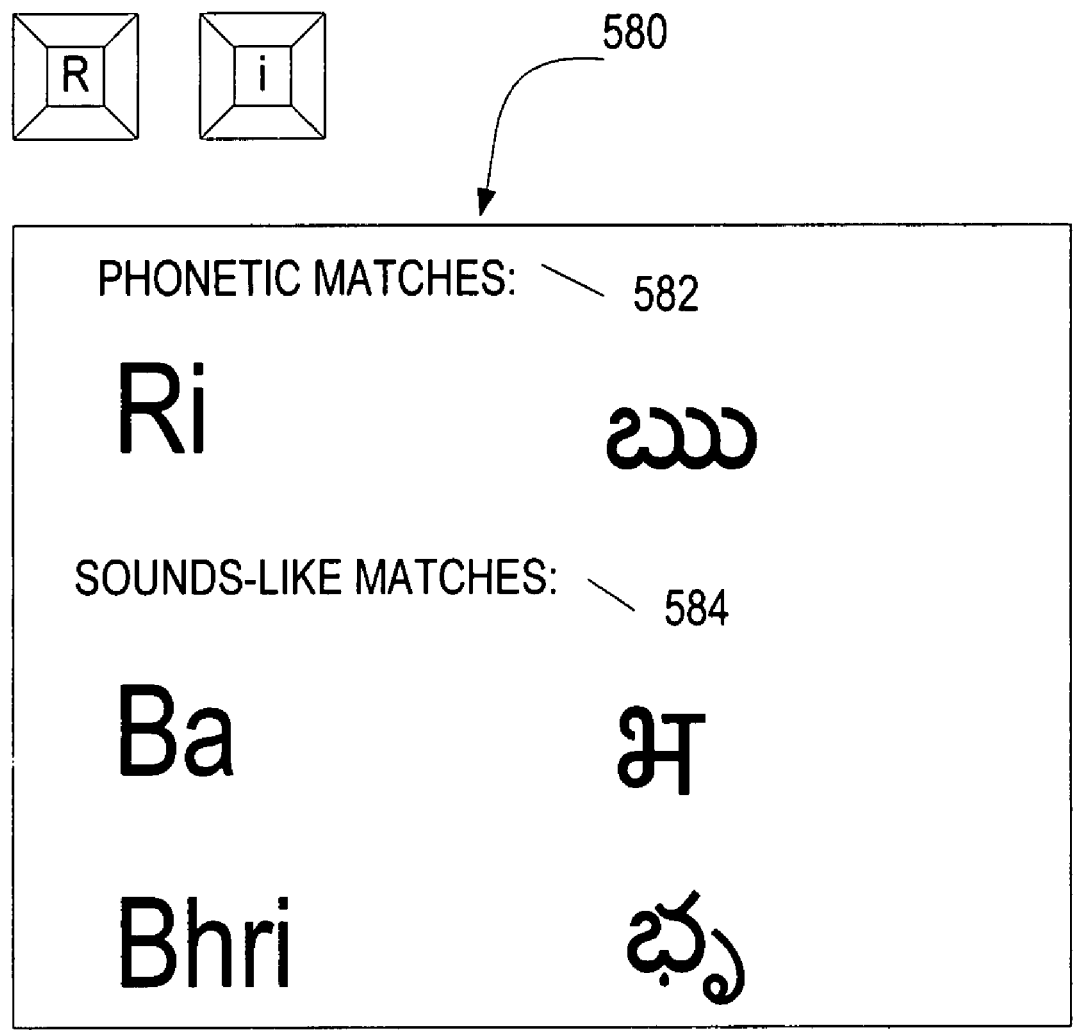
FIG. 13 is a diagram for one implementation of the system of FIG. 1 that illustrates a simulated suggestion list that includes phonetic matches and sounds-like matches.

FIG. 13 is a diagram for one implementation of the system of FIG. 1 that illustrates a simulated suggestion list that includes phonetic matches and sounds-like matches. As described in the stages of FIG. 7, in one implementation, the system uses a "sounds-like" algorithm/process to determine what additional combinations of characters in the destination language "sound" the same, even though they are different phonetically (stage 344). The system then includes some of these "sounds-like" matches 584 in the suggestion list 580 in addition to the normal phonetic matches 582 (stage 346).

Figure 14:
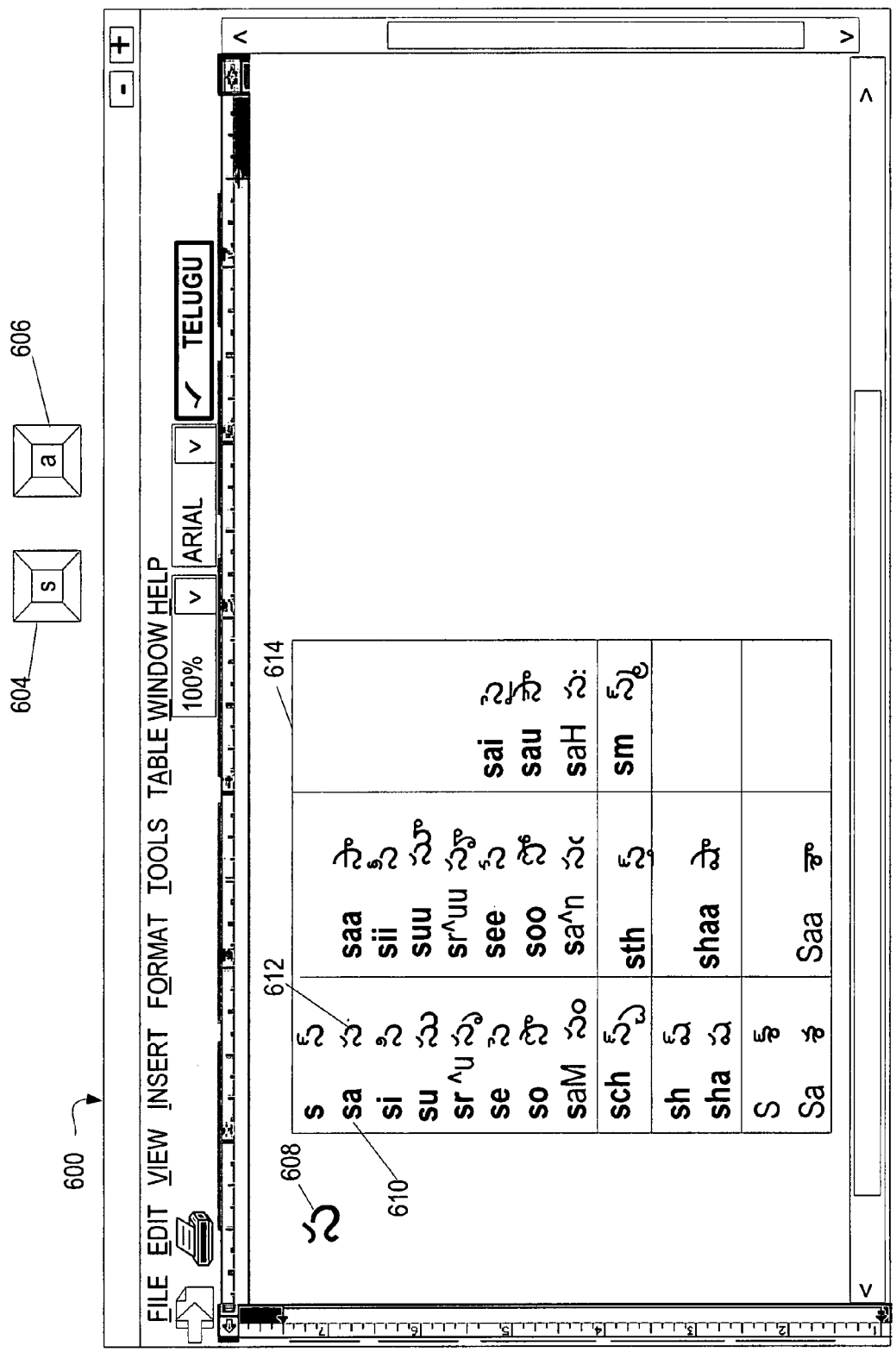
FIG. 14 is a simulated screen for one implementation of the system of FIG. 1 that illustrates a vertically oriented suggestion list to aid the user in inputting characters into a program in a destination language based on input in a source language.

FIG. 14 is a simulated screen 600 for one implementation of the system of FIG. 1 that illustrates a vertically oriented suggestion list 614 to aid the user in inputting characters into a program in a destination language 602 based on input in a source language. In the example shown, characters "s" 604 and "a" 606 were entered in English using an input device, and the resulting character 608 was displayed in the program because it was the character 612 that matched "sa" 610 in the suggestion list 614.

Figure 15:
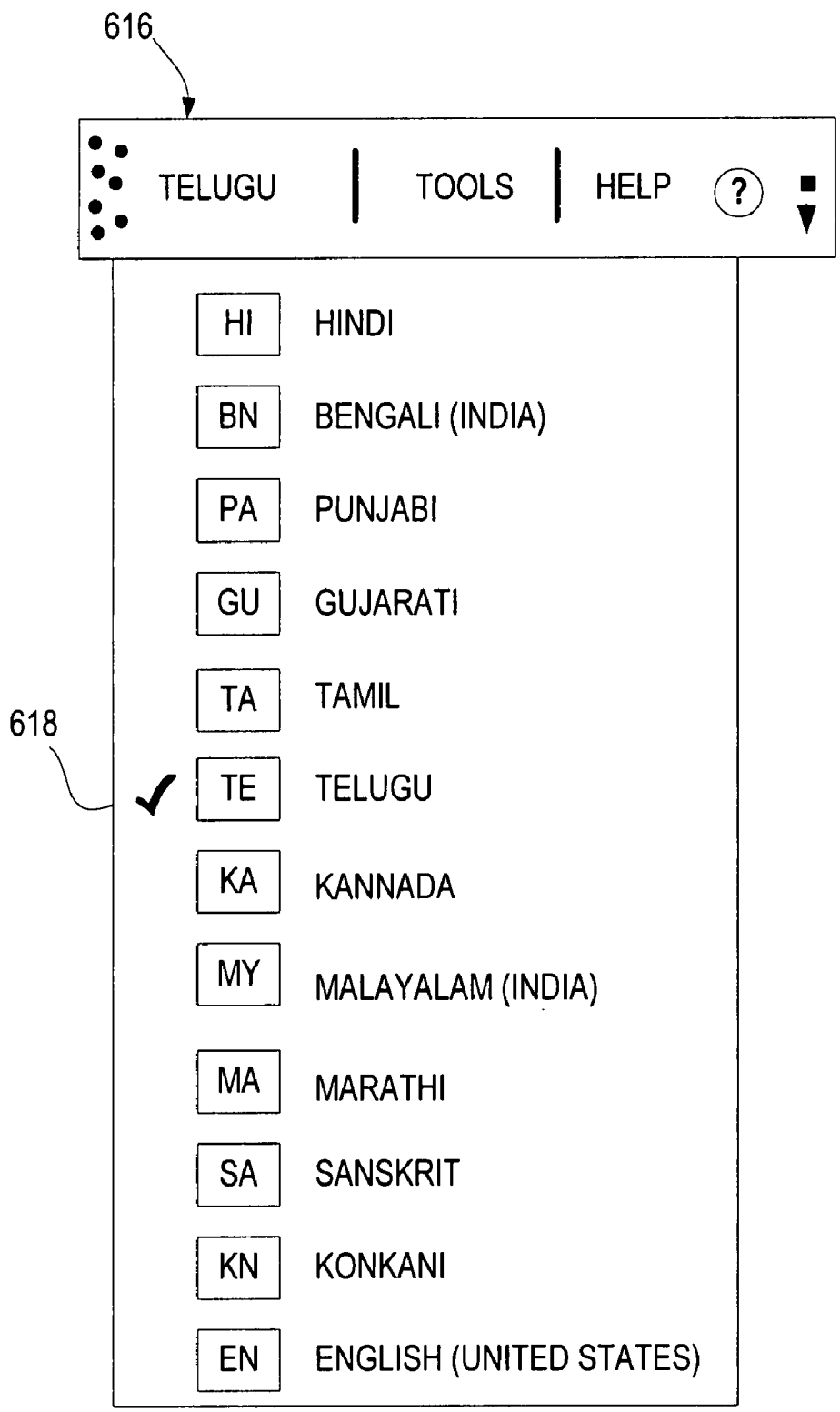
FIG. 15 is a simulated screen for one implementation of the system of FIG. 1 that illustrates a language bar to use for selecting a language to use for phonetic input.
Figure 16:
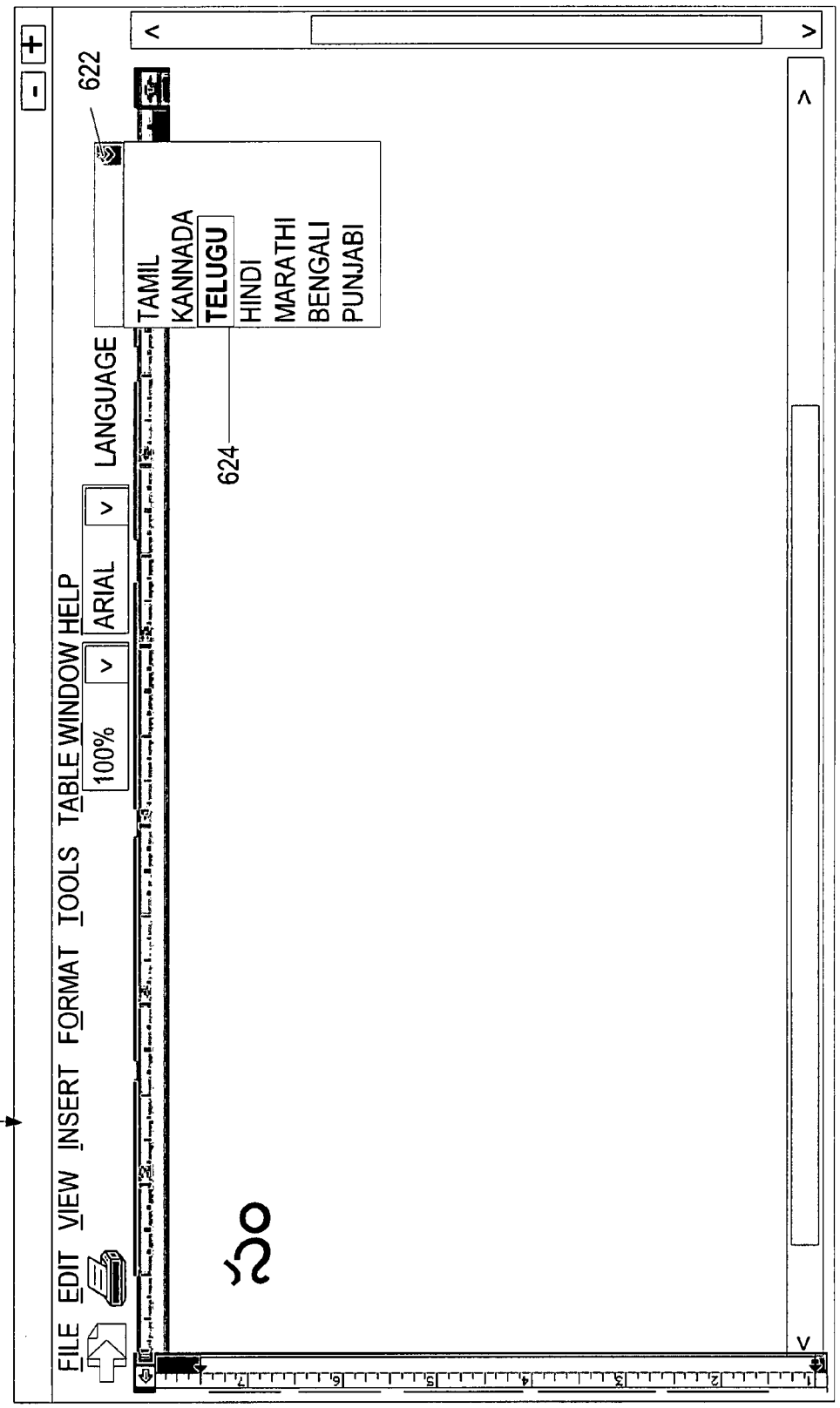
FIG. 16 is a simulated screen for one implementation of the system of FIG. 1 that illustrates selecting a destination language.

FIG. 15 is a simulated screen for one implementation of the system of FIG. 1 that illustrates a language bar 616 to use for selecting a language to use for phonetic input. The currently selected language 618 is shown with a check box, which in this example is Telugu. In one implementation, the language bar 616 is used to set a desired language for use with all applications in an operating system. In another implementation, the language bar is specific to one or more particular applications. FIG. 16 is a simulated screen 620 for another implementation of the system of FIG. 1 that illustrates selecting a destination language from within a particular application. Upon selecting a language option from list 622, the user can select the destination language to display the resulting data in, such as Telugu 624.

Figure 17:
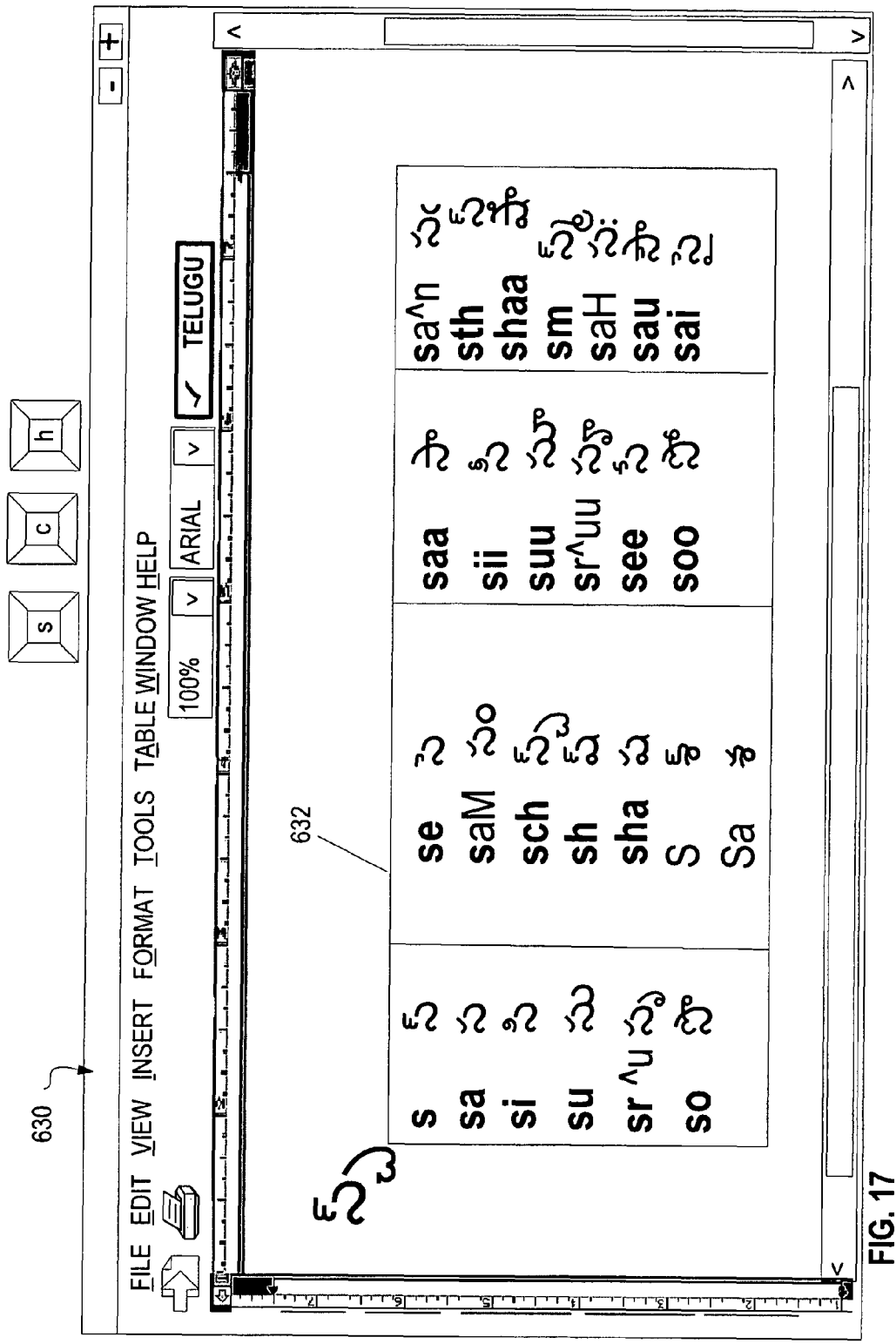
FIG. 17 is a simulated screen for one implementation of the system of FIG. 1 that illustrates a horizontally oriented suggestion list to aid the user in inputting characters into a program in a destination language based on input in a source language.

Similar to FIG. 14, FIG. 17 is a simulated screen 630 for one implementation of the system of FIG. 1 that illustrates a horizontally oriented suggestion list 632 to aid the user in inputting characters into a program in a destination language based on input in a source language. The screen 630 is said to be horizontally oriented because it expands more horizontally than it does vertically. Numerous other horizontal and/or vertical orientations for suggestion list 632 could also be used.

Figure 18:
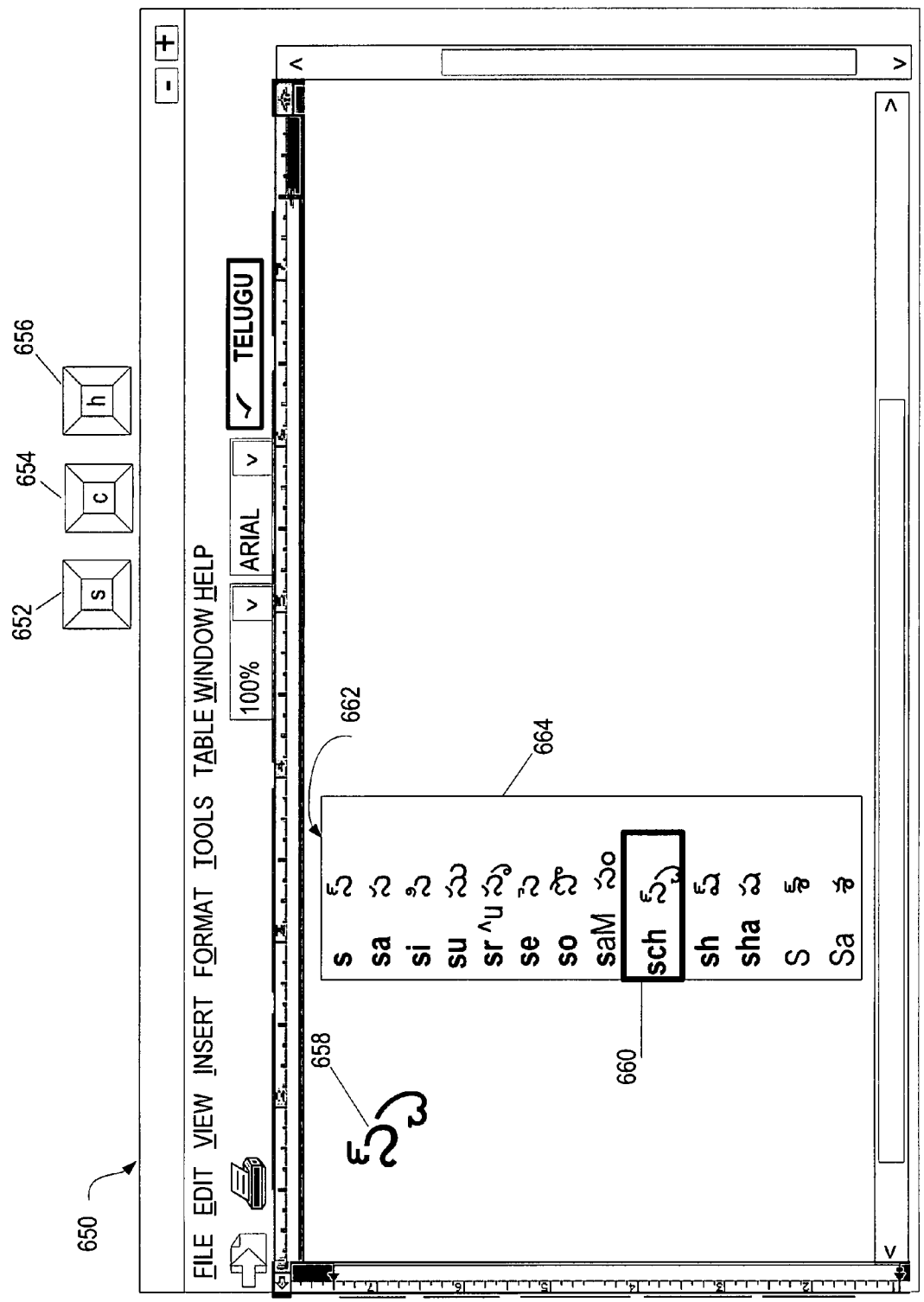
FIG. 18 is a simulated screen for one implementation of the system of FIG. 1 that illustrates a selectable suggestion list to aid the user in inputting characters into a program in a destination language based at least in part on selections from the suggestion list.

FIG. 18 is a simulated screen 650 for one implementation of the system of FIG. 1 that illustrates a selectable suggestion list 662 to aid the user in inputting characters into a program in a destination language based at least in part on selections from the suggestion list. In one implementation, as the user selects characters using an input device (such as characters "s" 652, "c" 654, and "h" 656), the matching value 660 is shown selected in the suggestion list 662. Alternatively or additionally, the user can select a desired match directly from the list 662 without having to further type characters. A scroll bar 664 allows the user to scroll down to view additional matching characters.

Figure 19:
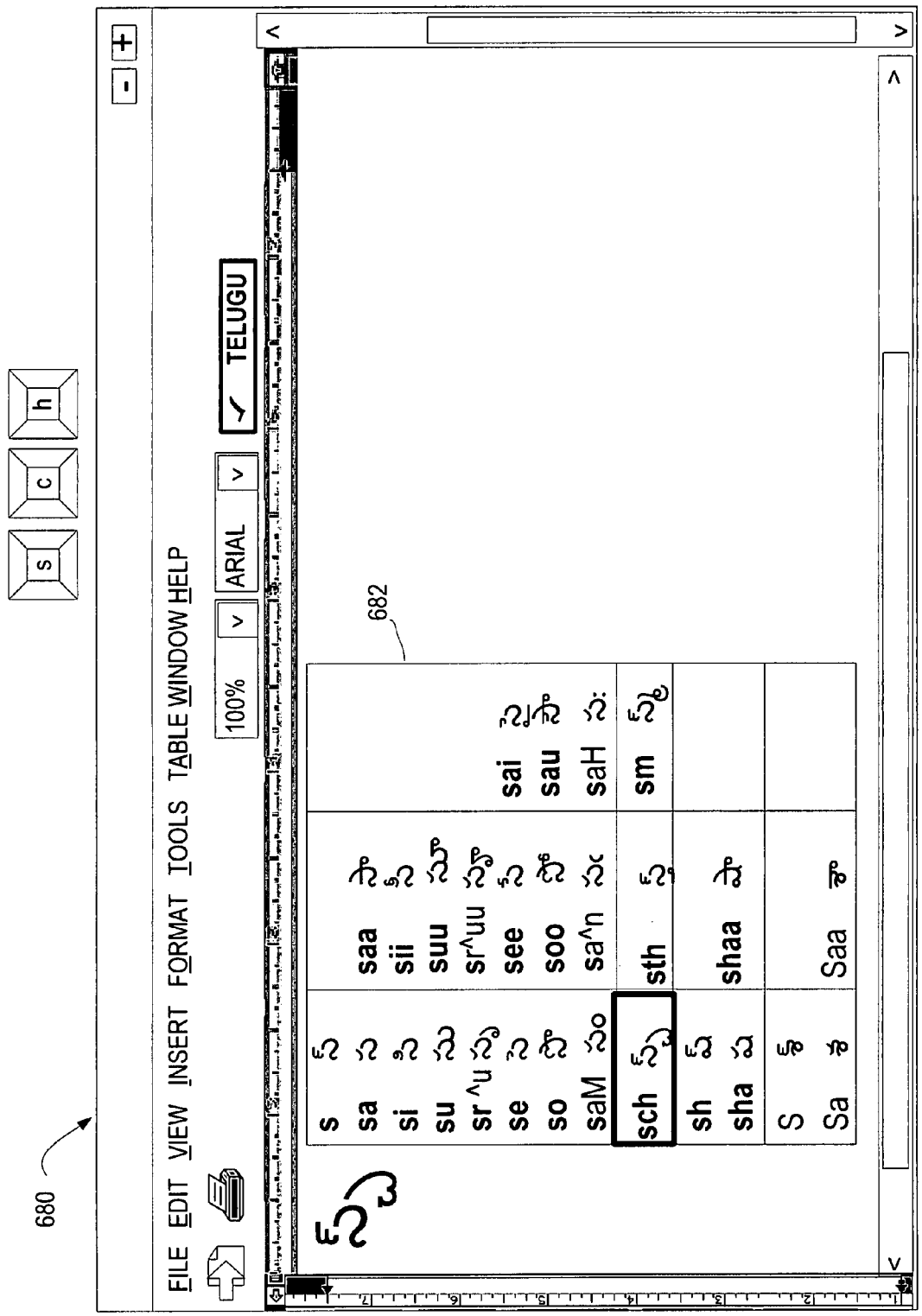
FIG. 19 is a simulated screen for one implementation of the system of FIG. 1 that illustrates a transparent suggestion list that allows a user to see contents present behind the suggestion list.

FIG. 19 is a simulated screen 680 for one implementation of the system of FIG. 1 that illustrates a transparent suggestion list 682 that allows a user to see contents present behind the suggestion list.

Figure 20:
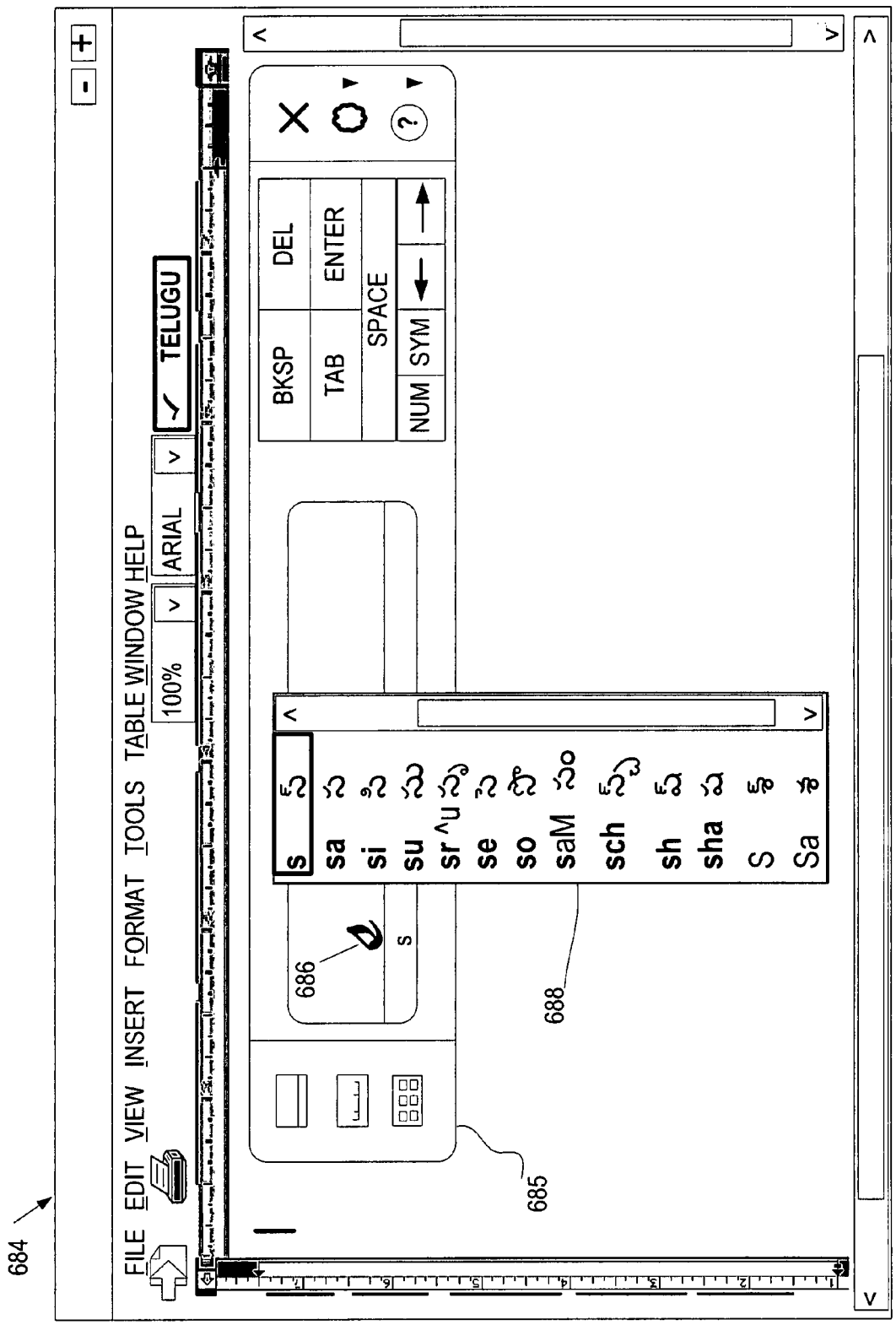
FIG. 20 is a simulated screen for one implementation of the system of FIG. 1 that illustrates displaying a suggestion list when the user inputs a handwritten character using a pen input device.

FIG. 20 is a simulated screen 684 for one implementation of the system of FIG. 1 that illustrates displaying a suggestion list when the user inputs a handwritten character using a pen input device. In the example shown, the user has entered a cursive "s" 686 in a pen input panel 685, and suggestion list 688 is shown to provide the user further guidance on possible phonetic options.

Figure 21:
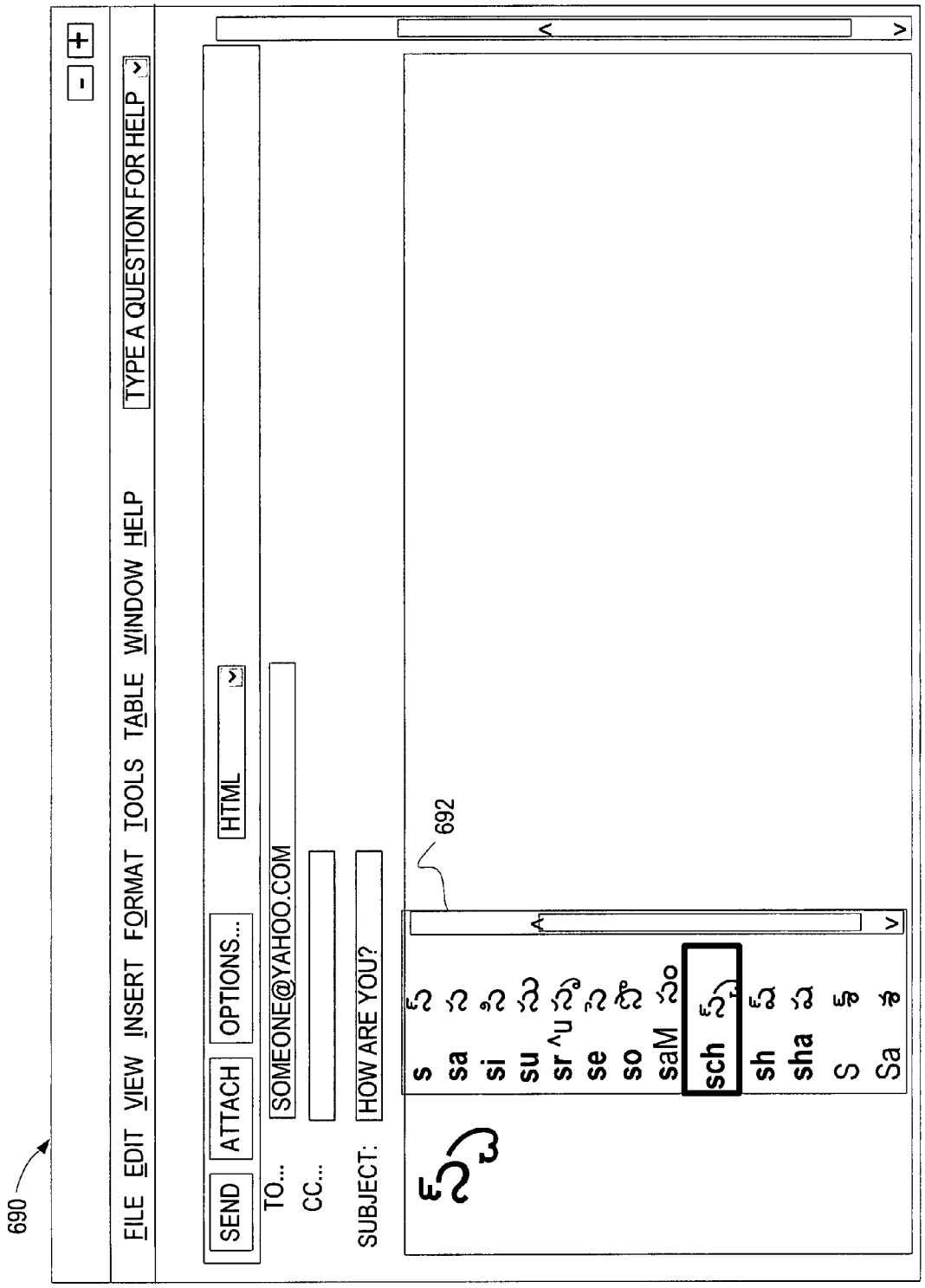
FIG. 21 is a simulated screen for one implementation of the system of FIG. 1 that illustrates displaying a suggestion list when the user is working in an email application.

FIG. 21 is a simulated screen 690 for one implementation of the system of FIG. 1 that illustrates displaying a suggestion list 692 when the user is working in an email application.

Figure 22:
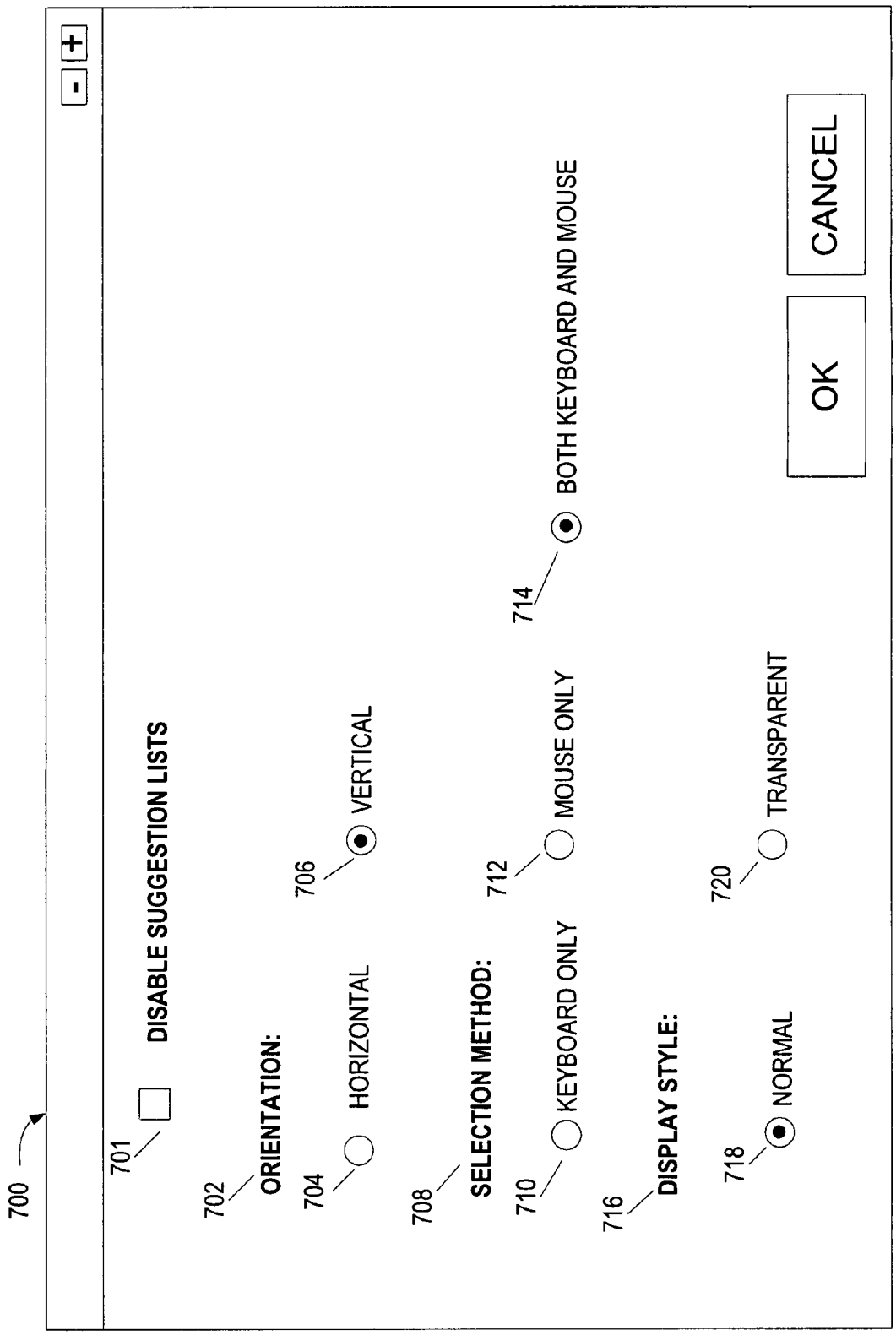
FIG. 22 is a simulated screen for one implementation of the system of FIG. 1 that illustrates allowing a user to customize suggestion list display options.

FIG. 22 is a simulated screen 700 for one implementation of the system of FIG. 1 that illustrates allowing a user to customize suggestion list display options. As described in the stages of FIG. 8, the user can customize the suggestion list display options in one implementation. Suggestion list display options screen 700 is a non-limiting example of the type of customization screen that could be used for such customizations. The user can check "disable suggestion lists" option 701 when he/she no longer desires to see the suggestion lists. The orientation option 702 can be set to horizontal 704, vertical 706, or others as provided. The selection method option 708 can be set to keyboard only 710, mouse only 712, or both keyboard and mouse 714, or others as provided. The display style option 716 can be set to normal 718, transparent 720, or others as desired. These are non-limiting examples of the types of suggestion list display options that could be used to allow the user to customize the user experience with suggestion lists for phonetic input. It will be appreciated that numerous other types of options could also be provided.

Figure 23:
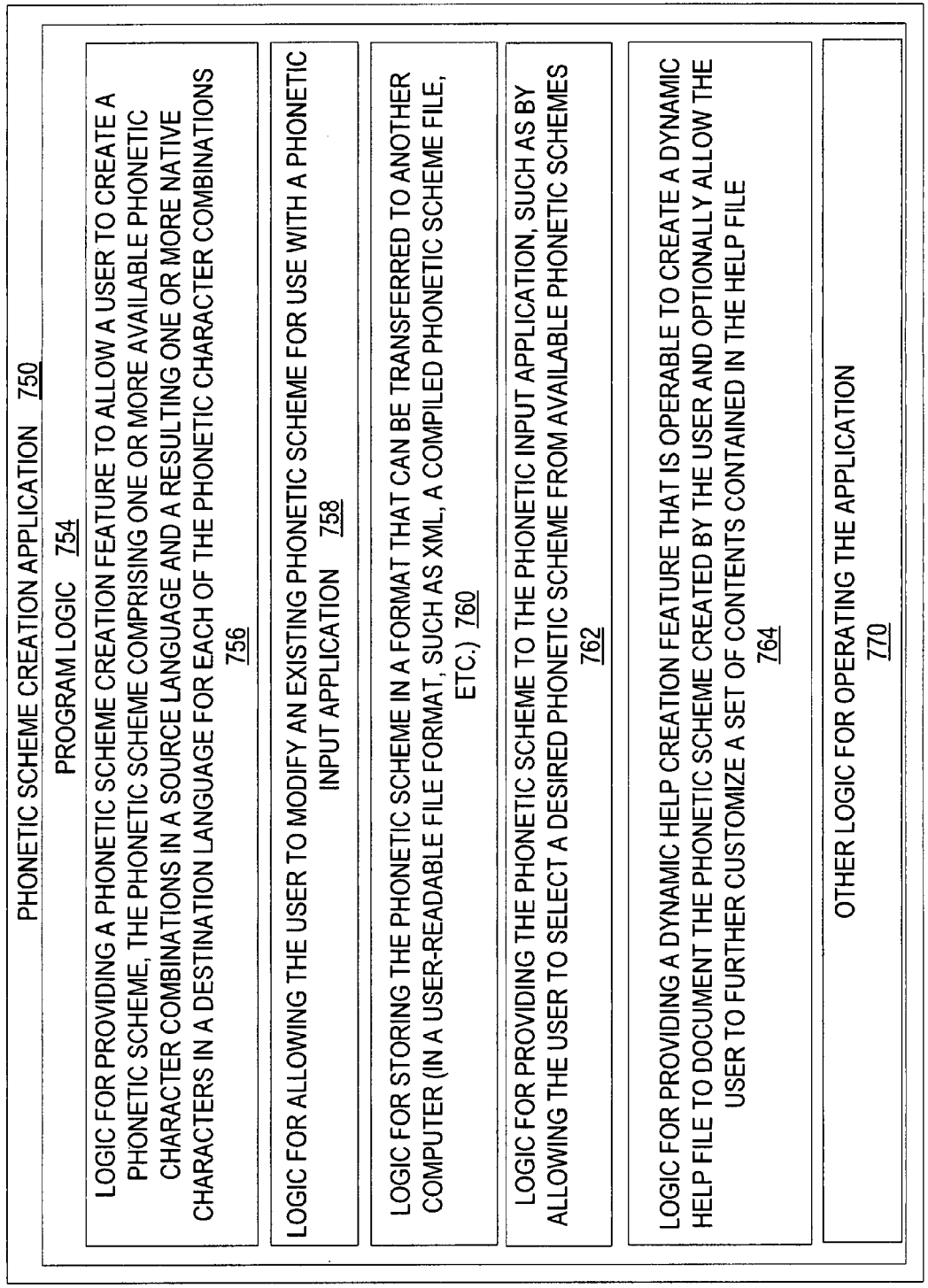
FIG. 23 is a diagrammatic view of a phonetic scheme creation application of one implementation.

Turning now to FIG. 23, a phonetic scheme creation application 750 operating on computing device 100 is illustrated. Phonetic scheme creation application 750 is one of the application programs that reside on computing device 100. However, it will be understood that phonetic scheme creation application 750 can alternatively or additionally be embodied as computer-executable instructions on one or more computers and/or in different variations than shown on FIG. 1. Alternatively or additionally, one or more parts of phonetic scheme creation application 750 can be part of phonetic input application 200, system memory 104, on other computers and/or applications 115, or other such variations as would occur to one in the computer software art.

Phonetic scheme creation application 750 includes program logic 754, which is responsible for carrying out some or all of the techniques described herein. Program logic 754 includes logic for providing a phonetic scheme creation feature to allow a user to create a phonetic scheme, the phonetic scheme comprising one or more available phonetic character combinations in a source language and a resulting one or more native characters in a destination language for each of the phonetic character combinations 756; logic for allowing the user to modify an existing phonetic scheme for use with a phonetic input application 758; logic for storing the phonetic scheme in a format that can be transferred to another computer (in a user-readable file format, such as xml, a compiled phonetic scheme file, etc.) 760; logic for providing the phonetic scheme to the phonetic input application, such as by allowing the user to select a desired phonetic scheme from available phonetic schemes 762; logic for providing a dynamic help creation feature that is operable to create a dynamic help file to document the phonetic scheme created by the user and optionally allow the user to further customize a set of contents contained in the help file 764; and other logic for operating the application 770. In one implementation, program logic 754 is operable to be called programmatically from another program, such as using a single call to a procedure in program logic 754.

Figure 24:
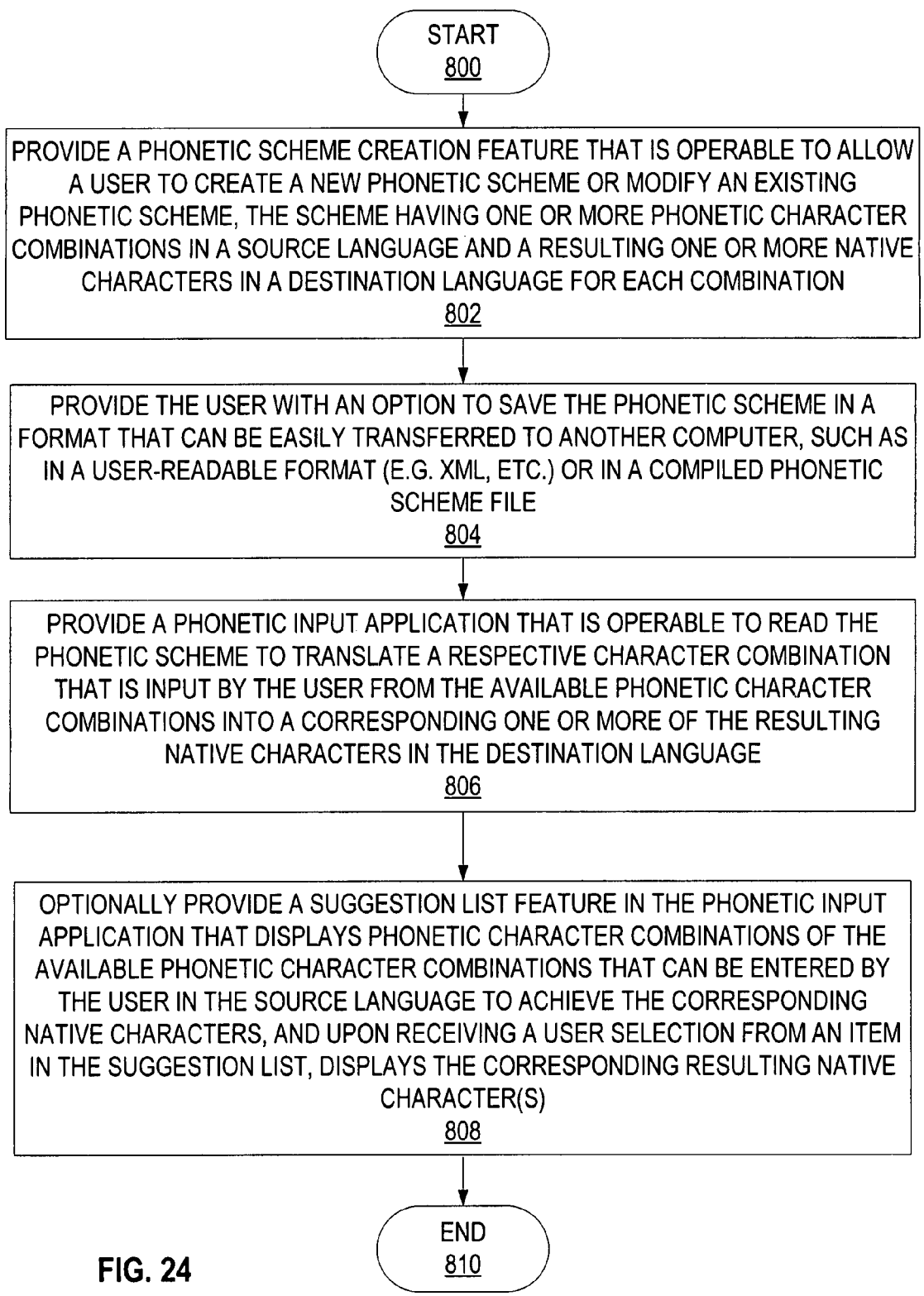
FIG. 24 is a high level process flow diagram for one implementation of the phonetic scheme creation application.

Turning now to FIGS. 24-28 with continued reference to FIG. 23, the stages for implementing one or more implementations of phonetic scheme creation application 750 are described in further detail. FIG. 24 illustrates a high level process flow diagram for one implementation of the phonetic scheme creation application. In one form, the process of FIG. 24 is at least partially implemented in the operating logic of computing device 100.

The procedure begins at start point 800 with providing a phonetic scheme creation feature that is operable to allow a user to create a new phonetic scheme or modify an existing phonetic scheme, the scheme having one or more phonetic character combinations in a source language and a resulting one or more native characters in a destination language for each combination (stage 802). The user is provided with an option to save the phonetic scheme in a format that can be easily transferred to another computer, such as in a user-readable format (e.g. xml, etc.) or in a compiled phonetic scheme file (stage 804). A phonetic input application is provided that is operable to read the phonetic scheme to translate a respective character combination that is input by the user from the available phonetic character combinations into a corresponding one or more of the resulting native characters in the destination language (stage 806). A suggestion list feature is optionally provided in the phonetic input application that displays phonetic character combinations of the available phonetic character combinations that can be entered by the user in the source language to achieve the corresponding native characters (stage 808). Upon receiving a user selection from an item in the suggestion list, the system displays the corresponding resulting native character(s) (stage 808). The procedure ends at end point 810.

Figure 25:
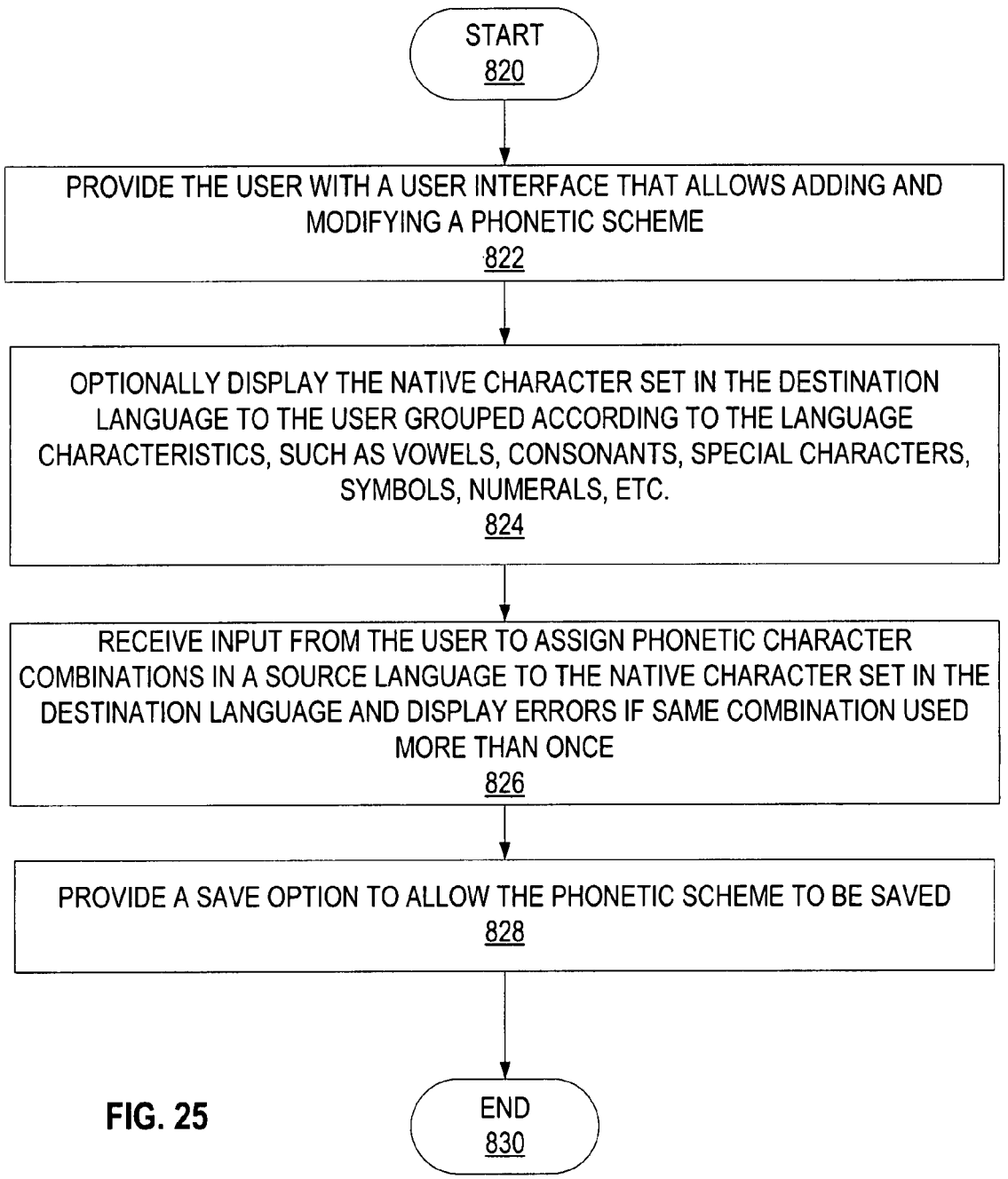
FIG. 25 is a process flow diagram for one implementation illustrating the stages involved in creating or modifying a phonetic scheme.

FIG. 25 is a process flow diagram for one implementation illustrating the stages involved in creating or modifying a phonetic scheme. In one form, the process of FIG. 25 is at least partially implemented in the operating logic of computing device 100. The procedure begins at start point 820 with providing the user with a user interface that allows adding and modifying a phonetic scheme (stage 822). The system optionally displays the native character set in the destination language to the user grouped according to the language characteristics, such as vowels, consonants, special characters, symbols, numerals, etc. (stage 824). Input is received from the user to assign phonetic character combinations in a source language to the native character set in the destination language and display errors if same combination used more than once (stage 826). A save option is provided to allow the phonetic scheme to be saved (stage 828). The procedure ends at end point 830.

Figure 26:
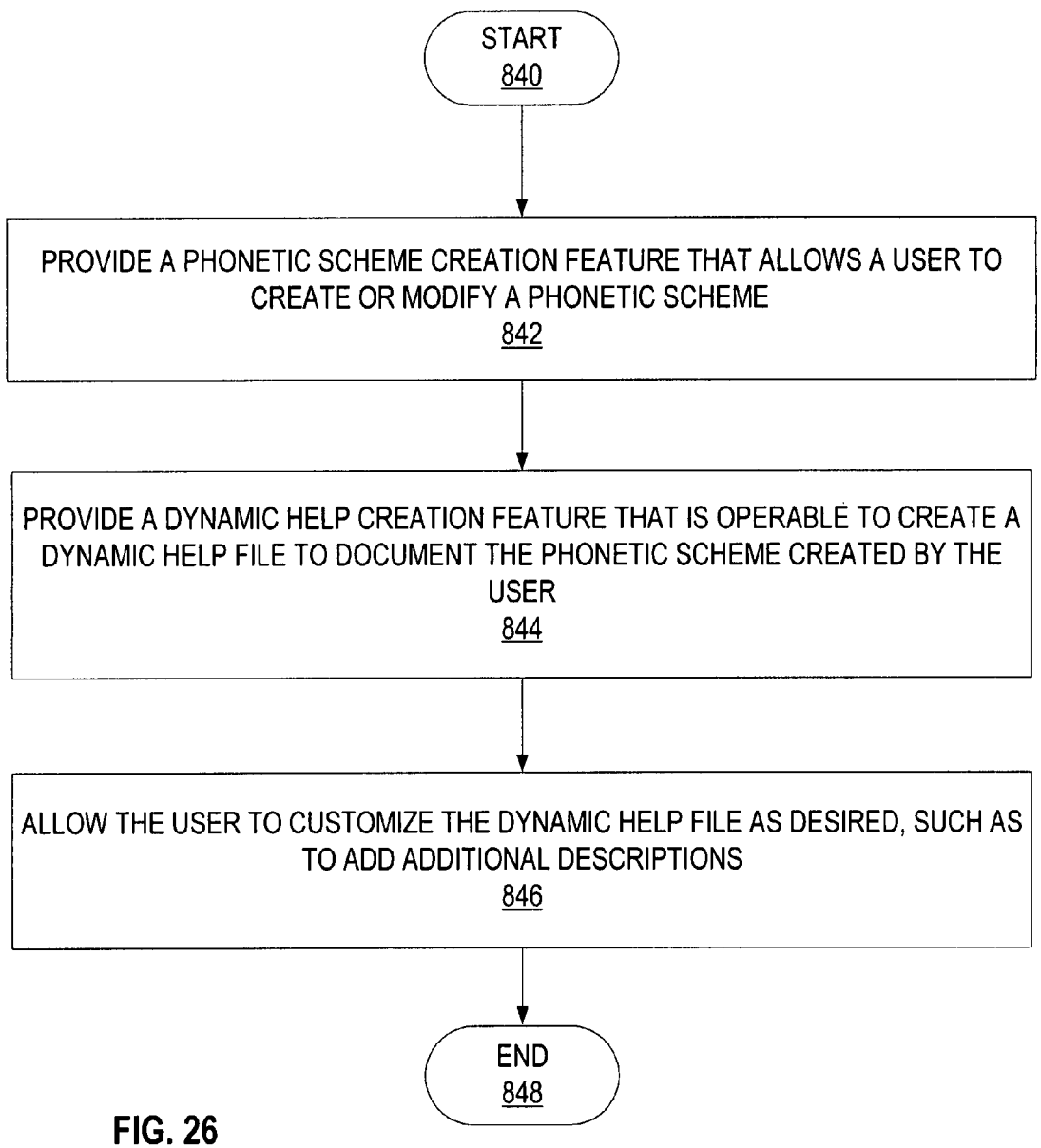
FIG. 26 is a process flow diagram for one implementation illustrating the stages involved in creating a dynamic help file for a phonetic scheme.

FIG. 26 is a process flow diagram for one implementation illustrating the stages involved in creating a dynamic help file for a phonetic scheme. In one form, the process of FIG. 26 is at least partially implemented in the operating logic of computing device 100. The procedure begins at start point 840 with providing a phonetic scheme creation feature that allows a user to create or modify a phonetic scheme (stage 842). A dynamic help creation feature is provided that is operable to create a dynamic help file to document the phonetic scheme created by the user (stage 844). The dynamic help file contains documentation on the mapping from the source language to the destination language. In one implementation, the dynamic help file does not include the metadata, since this information is less useful to the end user. The user can customize the dynamic help file as desired, such as to add additional descriptions (stage 846). The procedure ends at end point 848.

Figure 27:
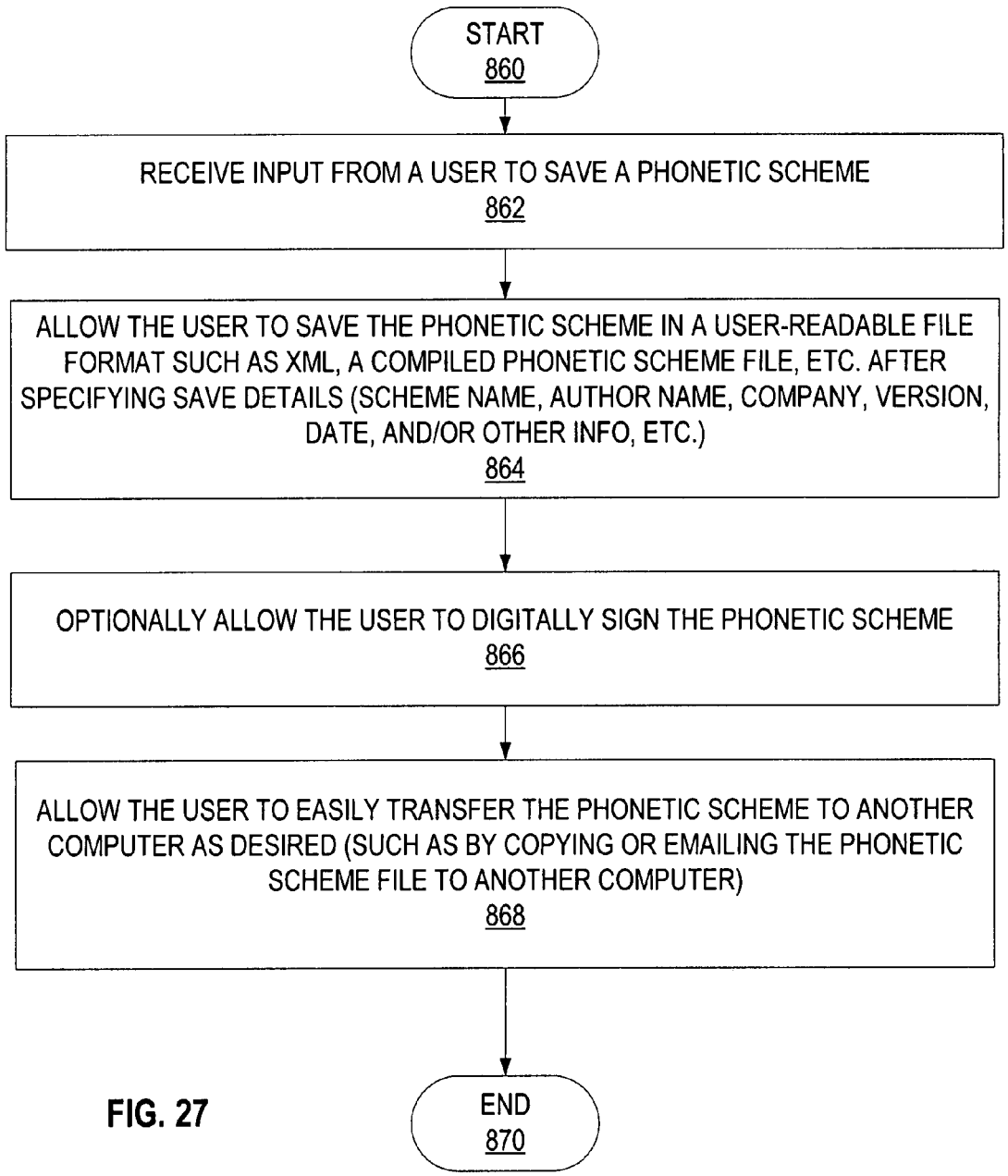
FIG. 27 is a process flow diagram for one implementation illustrating the stages involved in saving a phonetic scheme.

FIG. 27 is a process flow diagram for one implementation illustrating the stages involved in saving a phonetic scheme. In one form, the process of FIG. 27 is at least partially implemented in the operating logic of computing device 100. The procedure begins at start point 860 with receiving input from a user to save a phonetic scheme (stage 862). The user can save the phonetic scheme in a user-readable file format such as xml, a compiled phonetic scheme file, etc. (stage 864). In one implementation, the user is prompted to specify save details, such as scheme name, author name, company, version, data, and/or other information for the phonetic scheme prior to saving the scheme (stage 864). The user can optionally digitally sign the phonetic scheme (stage 866) to allow the phonetic scheme to have a recognized identity. The user can easily transfer the phonetic scheme to another computer as desired (such as by copying or emailing the phonetic scheme file to another computer) (stage 868). The procedure ends at end point 870.

Figure 28:
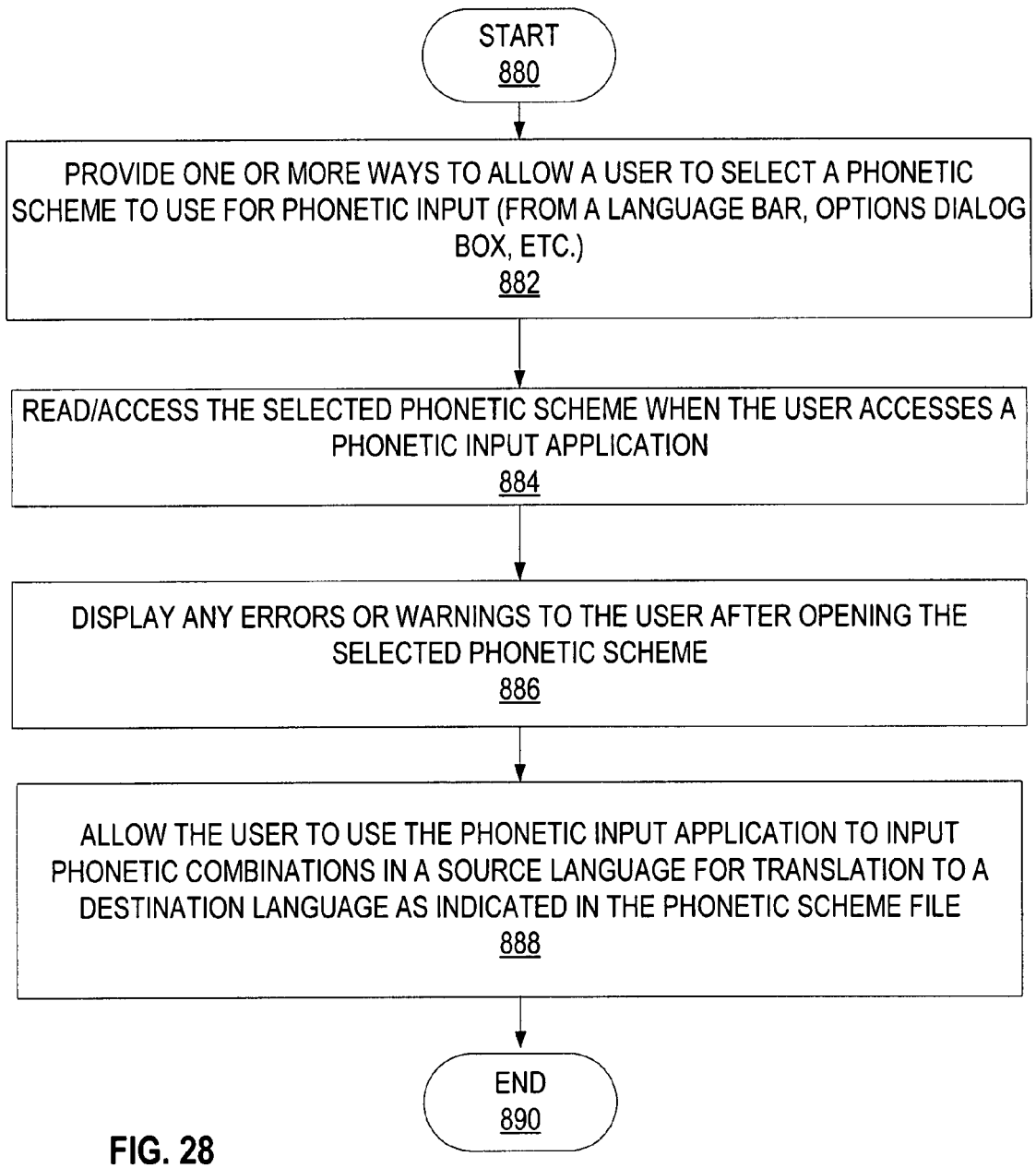
FIG. 28 is a process flow diagram for one implementation illustrating the stages involved in selecting a phonetic scheme.

FIG. 28 is a process flow diagram for one implementation illustrating the stages involved in selecting a phonetic scheme. In one form, the process of FIG. 28 is at least partially implemented in the operating logic of computing device 100. The procedure begins at start point 880 with providing one or more ways to allow a user to select a phonetic scheme to use for phonetic input (from a language bar, options dialog box, etc.) (stage 882). The system reads/accesses the selected phonetic scheme when the user accesses a phonetic input application (stage 884). Any errors or warnings are displayed to the user after opening the selected phonetic scheme (stage 886). The user can use the phonetic input application to input phonetic combinations in a source language for translation to a destination language as indicated in the phonetic scheme file (stage 888). The procedure ends at end point 890.

FIG. 29 is a simulated screen 900 for one implementation that illustrates creating or modifying a phonetic scheme. In the example shown, the native characters 904 in the destination language are shown grouped by the language characteristics, such as vowels, consonants, and so on. The user can modify the phonetic combinations 902 in the source language to show how they map to the native characters 904 in the destination language. Various other user interface designs could also be used to allow the user to modify phonetic schemes.

Figure 30:
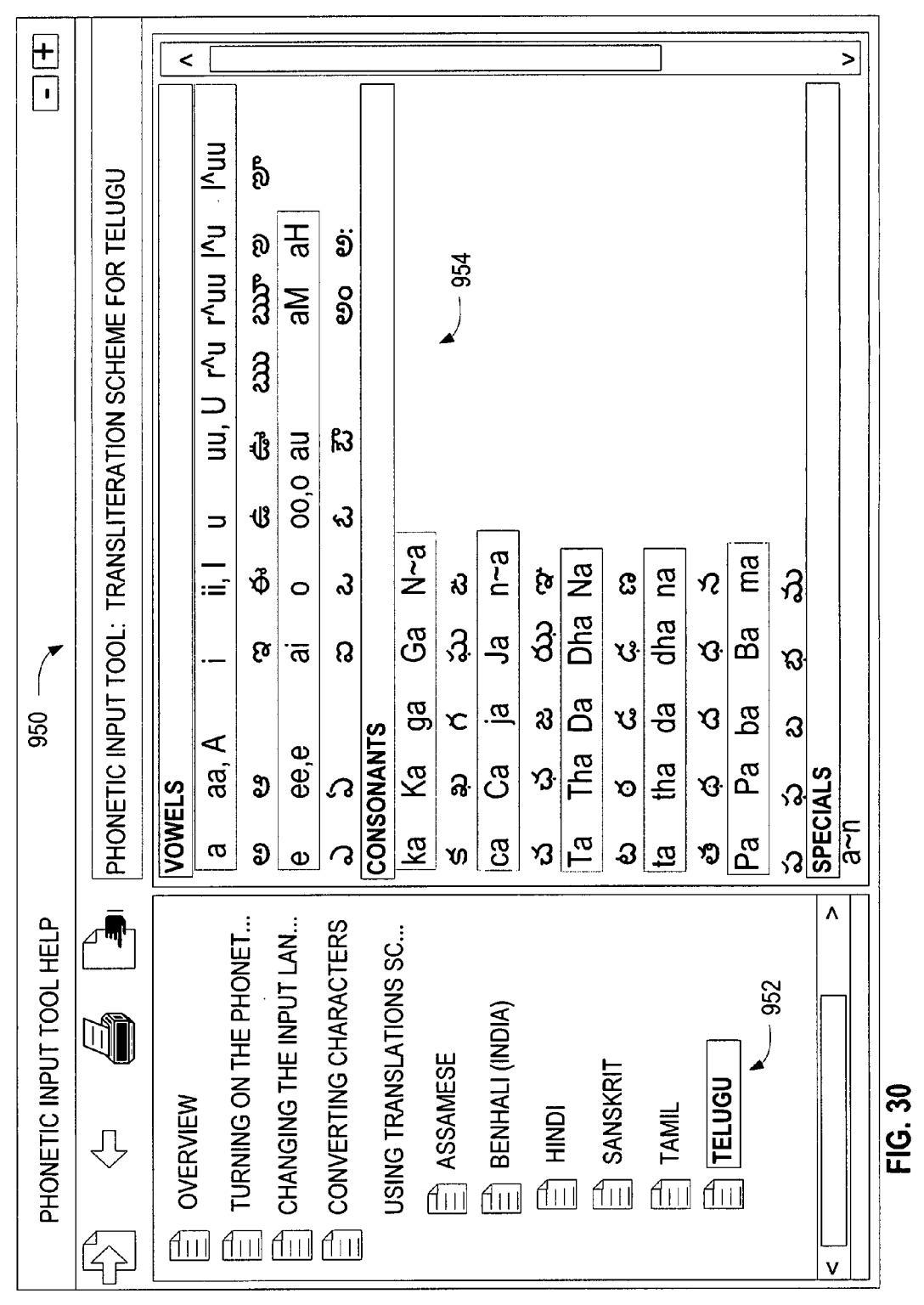

FIG. 30 is a simulated screen 950 for one implementation that illustrates a dynamic help file that was created for a phonetic scheme. The selected language in this example is Telugu 952. The dynamic help contents 954 that were created for Telugu are shown on the right section of the screen. In the example shown, the source character(s) are shown on top, with the resulting native character(s) in the destination language shown immediately below. The user can optionally make further edits to this dynamically created help file, such as to add further comments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-implemented method at a computing device for creating and using phonetic schemes, the method comprising:
    receiving input to create a phonetic scheme, the phonetic scheme comprising one or more phonetic character combinations in a source language and one or more native characters in a destination language for each of the phonetic character combinations;
    receiving a phonetic character combination in the source language;
    translating the phonetic character combination into one or more native characters in the destination language using the phonetic scheme, the phonetic character combination being translated by a phonetic input application executed by a processor of the computing device; and
    displaying a selectable list of suggestions of one or more native characters in the destination language, the suggestions including the one or more native characters in the destination language, a plurality of phonetic equivalents to the phonetic character combination based on the phonetic scheme, and a plurality of sound-alike equivalents to the one or more native characters in the destination language.

2. The computer-implemented method of claim 1, further comprising receiving a selection of a character combination from a phonetic scheme creation list that includes a first set of phonetic character combinations of the one or more phonetic character combinations in the source language to achieve the one or more native characters in the destination language, and displaying the one or more native characters.

3. The computer-implemented method of claim 1, wherein the input to create a phonetic scheme includes input to modify an existing phonetic scheme for use with the phonetic input application.

4. The computer-implemented method of claim 1, further comprising storing the phonetic scheme in a user-readable file.

5. The computer-implemented method of claim 4, wherein the user-readable file is an XML file format.

6. The computer-implemented method of claim 1, further comprising storing the phonetic scheme in a compiled phonetic scheme file.

7. The computer-implemented method of claim 1, wherein the phonetic scheme is stored in a format that allows the phonetic scheme to be transferred to another computer.

8. The computer-implemented method of claim 1, further comprising receiving a selection for a desired phonetic scheme from a plurality of phonetic schemes, the selection being received by the phonetic input application.

9. A computer-readable storage medium comprising instructions that are executable and, responsive to executing the instructions, a computer:
    receives input to create a phonetic scheme, the phonetic scheme comprising one or more phonetic character combinations in a source language and one or more native characters in a destination language for each of the phonetic character combinations;
    stores the phonetic scheme in a format that can be transferred to another computer;
    translates a phonetic character combination into one or more native characters in the destination language using the phonetic scheme, the phonetic character combination being translated by a phonetic input application executed by the computer; and
    displays a selectable list of suggestions of one or more native characters in the destination language, the suggestions including the one or more native characters in the destination language, a plurality of phonetic equivalents to the phonetic character combination based on the phonetic scheme, and a plurality of sound-alike equivalents to the one or more native characters in the destination language.

10. The computer-readable storage medium of claim 9, wherein the phonetic scheme is stored in a user-readable file format.

11. The computer-readable storage medium of claim 10, wherein the user-readable file format is an XML file format.

12. The computer-readable storage medium of claim 10, wherein the phonetic scheme is stored in a compiled phonetic scheme file.

13. The computer-readable storage medium of claim 9, further comprising additional instructions that are executable and, responsive to executing the additional instructions, the computer displays a selectable option to digitally sign the phonetic scheme.

14. The computer-readable storage medium of claim 9, further comprising additional instructions that are executable and, responsive to executing the additional instructions, the computer receives input to modify an existing phonetic scheme for use with the phonetic input application.

15. The computer-readable storage medium of claim 9, further comprising additional instructions that are executable and, responsive to executing the additional instructions, the computer receives input to select a particular phonetic scheme from a plurality of phonetic schemes.

16. The computer-readable storage medium of claim 9, further comprising additional instructions that are executable and, responsive to executing the additional instructions, the computer creates a dynamic help file to document the phonetic scheme created by a user.

17. The computer-readable storage medium of claim 16, further comprising additional instructions that are executable and, responsive to executing the additional instructions, the computer receives input to customize a set of contents contained in the dynamic help file.

18. A computer implemented method at a computing device for creating and documenting phonetic schemes, the method comprising:

receiving input to create a phonetic scheme, the phonetic scheme comprising one or more available phonetic character combinations in a source language and one or more native characters in a destination language for each of the phonetic character combinations; and receiving input to create a dynamic help file to document the phonetic scheme;

translating a phonetic character combination into the one or more native characters in the destination language using the phonetic scheme, the phonetic character combination being translated by a phonetic input application executed by a processor of the computing device; and displaying a selectable list of suggestions of the one or more native characters in the destination language, the suggestions including the one or more native characters in the destination language, a plurality of phonetic equivalents to the phonetic character combination based on the phonetic scheme, and a plurality of sound-alike equivalents to the one or more native characters in the destination language.

\* \* \* \* \*